United States Patent
Ibrahim et al.

(10) Patent No.: US 11,119,069 B2
(45) Date of Patent: Sep. 14, 2021

(54) DEVICE AND METHOD TO MANIPULATE IONS IN MULTI LEVEL SYSTEM

(71) Applicant: Battelle Memorial Institute, Richland, WA (US)

(72) Inventors: Yehia M. Ibrahim, West Richland, WA (US); Adam L. Hollerbach, Richland, WA (US); Ailin Li, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 34 days.

(21) Appl. No.: 16/664,435

(22) Filed: Oct. 25, 2019

(65) Prior Publication Data
US 2020/0378922 A1      Dec. 3, 2020

Related U.S. Application Data

(60) Provisional application No. 62/853,443, filed on May 28, 2019.

(51) Int. Cl.
*G01N 27/00*      (2006.01)
*G01N 27/622*     (2021.01)
(Continued)

(52) U.S. Cl.
CPC .......... *G01N 27/622* (2013.01); *H01J 49/061* (2013.01); *H01J 49/062* (2013.01); *H01J 49/4225* (2013.01); *G01N 27/68* (2013.01)

(58) Field of Classification Search
CPC .... G01N 27/622; G01N 27/68; G01N 27/623; H01J 49/061; H01J 49/4225; H01J 49/062
(Continued)

(56) References Cited

U.S. PATENT DOCUMENTS 7,491,930 B2   2/2009   Shvartsburg et al.
7,888,635 B2   2/2011   Belov et al.
(Continued)

OTHER PUBLICATIONS

International Search Report and Written Opinion, PCT Application No. PCT/US2020/034738, dated Sep. 16, 2020, 15 pages.
(Continued)

*Primary Examiner* — Michael Maskell
(74) *Attorney, Agent, or Firm* — Klarquist Sparkman, LLP

(57) ABSTRACT

An apparatus includes multiple levels of ion transport channels, with successive levels coupled by elevator channels. Efficient three dimensional packing provides long path lengths in practical volumes for ion mobility separation with high resolving power. Disclosed elevator configurations provide efficient routing of ion transport channels across levels with low ion loss, enabling ion mobility separation over 100 levels or more. Elevator configurations include (i) opposed traveling waves meeting at an elevator entrance, (ii) external elevator with a wrap-around electrode bank, (iii) external elevator with electrode banks on parallel extension plates, or (iv) elevator operating in surfing mode, in various combinations. Manufacture is aided by printed wiring boards, with interchangeable boards. Assembly with motherboard, spacer block(s), and alignment pins provides efficient distribution of electrode excitations and accurate reproducible positioning.

25 Claims, 11 Drawing Sheets

(51) Int. Cl.
*H01J 49/06* (2006.01)
*H01J 49/42* (2006.01)
*G01N 27/68* (2006.01)

(58) Field of Classification Search
USPC ..................................... 250/281, 282, 396 R
See application file for complete search history.

(56) References Cited

U.S. PATENT DOCUMENTS

| | | | |
|---|---|---|---|
| 8,541,737 | B2 | 9/2013 | Ibrahim et al. |
| 8,772,711 | B1 | 7/2014 | Webb et al. |
| 8,835,839 | B1 * | 9/2014 | Anderson ............... H01J 49/06 250/290 |
| 8,901,490 | B1 | 12/2014 | Chen et al. |
| 8,907,273 | B1 | 12/2014 | Chen et al. |
| 8,969,800 | B1 | 3/2015 | Tolmachev et al. |
| 9,063,086 | B1 | 6/2015 | Garimella et al. |
| 9,245,725 | B2 | 1/2016 | Ibrahim et al. |
| 9,558,925 | B2 | 1/2017 | Ibrahim et al. |
| 9,704,701 | B2 | 7/2017 | Ibrahim et al. |
| 9,812,311 | B2 | 11/2017 | Anderson et al. |
| 9,824,874 | B2 | 11/2017 | Ibrahim et al. |
| 9,939,409 | B2 | 4/2018 | Ibrahim et al. |
| 9,966,244 | B2 | 5/2018 | Anderson et al. |
| 10,018,592 | B2 | 7/2018 | Ibrahim et al. |
| 10,224,194 | B2 | 3/2019 | Ibrahim et al. |
| 10,317,364 | B2 | 6/2019 | Garimella et al. |
| 10,332,723 | B1 | 6/2019 | Ibrahim et al. |
| 10,424,474 | B2 | 9/2019 | Ibrahim et al. |
| 10,460,920 | B1 | 10/2019 | Smith et al. |
| 2012/0153140 | A1 | 6/2012 | Makarov |
| 2014/0299766 | A1 * | 10/2014 | Anderson ............... H01J 49/06 250/290 |
| 2014/0353493 | A1 | 12/2014 | Mordehai et al. |
| 2016/0320340 | A1 | 11/2016 | Giles et al. |
| 2019/0004011 | A1 * | 1/2019 | Garimella ............... H01J 49/26 |
| 2019/0057852 | A1 | 2/2019 | Ibrahim et al. |
| 2019/0103261 | A1 * | 4/2019 | Ibrahim ............... H01J 49/061 |
| 2019/0108990 | A1 | 4/2019 | Prabhakaran et al. |

OTHER PUBLICATIONS

Ibrahim et al., "Ion Elevators and Escalators in Multilevel Structures for Lossless Ion Manipulations", *Anal. Chem.* 2017, 89, pp. 1972-1977 (2017).

Deng et al., "Serpentine Ultralong Path with Extended Routing (SUPER) High Resolution Traveling Wave Ion Mobility-MS using Structures for Lossless Ion Manipulations", *Anal. Chem.* 2017, 89, pp. 4628-4634 (2017).

Garimella et al., "Squeezing of Ion Populations and Peaks in Traveling Wave Ion Mobility Separations and Structures for Lossless Ion Manipulations Using Compression Ratio Ion Mobility Programming", *Anal. Chem.* 2016, 88, pp. 11877-11885 (2016).

* cited by examiner

FIG. 8A    FIG. 8B

LEVEL 4

LEVEL 5

LEVEL 6

SEPARATION MODE TIME SERIES

SURFING MODE TIME SERIES

DEVICE AND METHOD TO MANIPULATE IONS IN MULTI LEVEL SYSTEM

CROSS REFERENCE TO RELATED APPLICATION

This application claims the benefit of U.S. Provisional Application No. 62/853,443 filed May 28, 2019 and titled "DEVICE AND METHOD TO MANIPULATE IONS IN MULTI-LEVEL SYSTEM" the disclosure of which is incorporated by reference in entirety.

ACKNOWLEDGMENT OF GOVERNMENT SUPPORT

This invention was made with government support under contract DE-AC05-76RL01830 awarded by the United States Department of Energy; under grant CA217699 awarded by the NIH National Cancer Institute; and under grants GM130709-01 and GM103493-10 awarded by the NIH National Institute of General Medical Sciences. The government has certain rights in the invention.

FIELD

The field is ion manipulation devices.

BACKGROUND

Ion mobility spectrometry (IMS) is a gas phase separation technique that is continuously gaining popularity due to its ability to distinguish between ions of different shapes, improved dynamic range, and its speed compared to liquid phase techniques. Because the resolution in IMS depends on the time ions spend interacting with the electric field and colliding with buffer gas, one way to increase the time is by increasing the length of the separation channel. For instance, in the drift tube IMS a length of three meters has been reported. However, because the resolution is dependent on the square-root of the separation channel length, it can be challenging to reach desired lengths in an instrument of practical size. Therefore, a need remains for improved technologies for increasing the separation channel length.

SUMMARY

According to an aspect of the disclosed technology, an apparatus includes first and second sets of electrodes. The first set of electrodes is configured to direct ions in a first direction to an elevator entrance. The second set of electrodes is configured to generate a traveling wave propagating to the elevator entrance in a second direction opposed to the first direction.

In some examples, the first set of electrodes can include confinement electrodes arranged on opposed surfaces and first traveling wave electrodes also arranged on the opposed surfaces. The second set of electrodes can include second traveling wave electrodes arranged on the opposed surfaces. The first set of electrodes can define an ion transport channel on a first ion mobility separation level between the opposed surfaces. The ion transport channel can terminate at the elevator entrance. In further examples, one or more electrodes of the first set of electrodes at the elevator entrance can be configured to operate in a surfing mode.

In certain examples, a multi-level ion manipulation system can be formed using a plurality of such apparatuses arranged adjacent to one another, in sequence, and one or more elevators. The ion transport channels of each adjacent pair of the apparatuses can be coupled by a respective one of the elevators. One or more of the ion transport channels can be serpentine, with a length exceeding a multiple of a maximum length dimension of the corresponding ion mobility separation level. The multiple can be three times, five times, ten times, or even more. At least one of the elevators can include an ion elevator channel through an aperture in one of the opposed surfaces, the ion elevator channel can couple the elevator entrance on the first ion mobility separation level to an elevator exit on a second ion mobility separation level.

In additional examples, the traveling wave generated by the second set of electrodes can be a second traveling wave, and the elevator can include third confinement electrodes and third traveling wave electrodes defining the ion elevator channel. The third traveling wave electrodes can be configured to generate a third traveling wave propagating in a direction orthogonal to the first ion mobility separation level. The ion transport channel on the first ion mobility separation level can be configured to guide and separate the ions with a first traveling wave in a separation mode. The third traveling wave can be in a surfing mode. The third traveling wave electrodes can include transition electrodes extending at least a quarter period of the third traveling wave away from the aperture into the first ion mobility separation level.

According to another aspect of the disclosed technologies, an apparatus includes a first ion transport channel, a second ion transport channel, and an elevator. The first ion transport channel is configured to direct ions within a first plane and is defined by electrode arrangements on a first pair of opposed surfaces. The second ion transport channel is configured to direct the ions within a second plane distinct from the first plane and is defined by electrode arrangements on a second pair of opposed surfaces. The elevator is configured to direct the ions between the first and second planes, in a direction orthogonal to the first and second planes. The elevator includes (i) elevator electrodes arranged on a wrap-around surface joining an outermost pair of the opposed surfaces, or (ii) elevator electrodes arranged on a pair of opposed elevator surfaces each extending outward from the outermost pair of the opposed surfaces.

Following (i) in some examples, the elevator can include the elevator electrodes arranged on the wrap-around surface, and can also include at least one inner electrode arranged on a sidewall of the shared printed wiring board.

Following (ii) in other examples, the elevator can include the elevator electrodes arranged on the pair of opposed elevator surfaces. The opposed elevator surfaces can be orthogonal to the first and second pairs of the opposed surfaces and can be parallel to a first directions of ion transport in the first planar ion transport channel as the ions enter the elevator or to a second direction of ion transport in the second planar ion transport channel as the ions exit the elevator. The elevator electrodes can be symmetrically positioned on the pair of opposed elevator surfaces. The elevator electrodes can include a first group of electrodes configured to generate a first traveling wave propagating in the direction orthogonal to the planes from one surface of the outermost pair of opposed surfaces to the other surface of the outermost pair of opposed surfaces. The elevator electrodes can include a first group of electrodes configured to generate a first traveling wave propagating in the direction orthogonal to the planes. The elevator electrodes can include a second group of electrodes configured to generate a second traveling wave propagating in a direction parallel to the planes.

In additional examples, the first and second pairs of the opposed surfaces, and the wrap-around surface or the elevator surfaces, can be surfaces of respective printed wiring boards (PWBs). One of the PWBs can be shared between the first and second planar ion transport channels, and can separate the first and second ion transport channels. The electrode arrangements of the first and second planar ion transport channels and the elevator electrodes can be configured to generate respective traveling waves. The traveling waves in the first and second planar ion transport channels can be in a separation mode, and the traveling wave generated by the elevator electrodes can be in a surfing mode.

In certain examples, a plurality of such apparatuses can be arranged in succession to form a multi-level ion manipulation system. The second planar ion transport channel of a given one of the apparatuses can be the first planar ion transport channel of a next one of the apparatuses.

According to a further aspect of the disclosed technologies, an apparatus includes a frame having one or more motherboards and one or more spacer blocks. At least a given one of the motherboards and at least a given one of the spacer blocks are situated on distinct sides of the frame. The spacer block(s) include a plurality of parallel slots configured to receive respective printed wiring boards (PWBs). The PWBs are retained in the frame in a spaced apart configuration. The motherboards include a plurality of connectors configured to provide electrical signals to electrodes on the PWBs. The electrodes on the PWBs are configured to define a multi-level ion transport channel.

In some examples, the apparatus can include a housing configured to receive and support the frame. The housing can define a chamber for the multi-level ion transport channel. The apparatus can include an alignment mechanism configured to align the PWBs in relation to the frame or housing. The apparatus can include an alignment pin configured to be inserted into an alignment hole of at least one of the PWBs retained in the frame to align the at least one PWB in relation to the frame or housing.

In additional examples, there can be N PWBs defining N−1 levels of ion transport channels. There can be at least four levels. Two or more of the N PWBs can have identical electrode layouts. In further examples, there can be at least eight PWBs, including end PWBs around an alternating stack of odd-numbered and even-numbered PWBs. The odd-numbered PWBs can be interchangeable, and the even-numbered PWBs can be interchangeable.

In certain examples, the apparatus can be incorporated into an ion transport system, together with an ion injector, an input switch, an ion receiver, and an output switch, and an ion recirculation channel. The input switch can be coupled between the ion injector and an input port of the apparatus. The output switch can be coupled between an output port of the apparatus and the ion receiver. The recirculation ion channel can be coupled between the output switch and the input switch.

The foregoing and other objects, features, and advantages of the disclosed technology will become more apparent from the following detailed description, which proceeds with reference to the accompanying figures.

BRIEF DESCRIPTION OF THE DRAWINGS

FIGS. 8A-8B are breakaway and assembled oblique views illustrating a third example elevator according to the disclosed technologies.

DETAILED DESCRIPTION

Introduction

Figure 1:
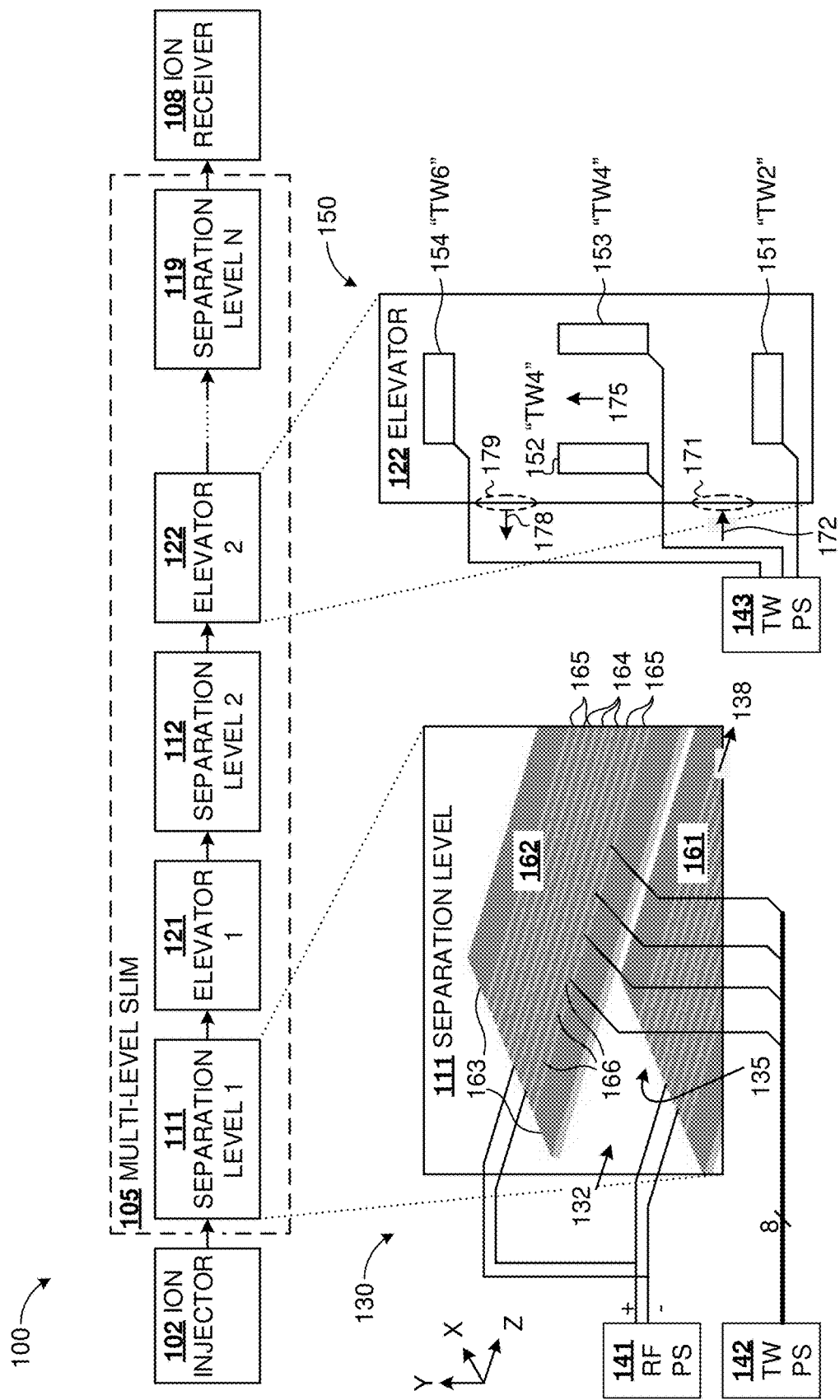
FIG. 1 is a schematic diagram of a first example multi-level ion manipulation system according to the disclosed technologies.

The resolution of ion mobility separation can be proportional to $\sqrt{L}$, where L is the path length of a separation channel. Approaches have used drift tubes and serpentine planar channels to achieve on the order of 10 m path length. One approach to recycle ions through a finite channel can suffer from a race condition as faster ion species can catch up with and overtake slower ion species, thus limiting the practical number of cycles that can be employed. Another approach is to stack planar channels, however this approach can also suffer from lack of scalability if there are significant losses while transporting ions across levels. Dimensional variations can also lead to losses.

The disclosed technologies tackle these challenges in various ways, which can be implemented in varying combinations. Some described examples are multi-level SLIM (Structure for Lossless Ion Manipulation) apparatus that use traveling waves to guide ions along one or more planar transport channels, and use elevator channels to guide ions between planes. In some examples, opposing traveling waves can be used to reduce losses when transitioning from a horizontal planar channel to a vertical elevator channel. In further examples, a surfing mode can be used to temporarily confine ions through an elevator channel and optionally short portions of planar channels leading to or from the elevator channel. In additional examples, a frame, motherboard, spacer blocks, or alignment pins can be used to control dimensional variability. In still further examples, printed wiring boards with repeating electrode patterns can be used to simplify the manufacturing of a multi-layer SLIM device.

Terminology

The usage and meaning of all quoted terms in this section applies throughout this disclosure unless clearly indicated otherwise or inconsistent with the context. The terminology below extends to related word forms.

An "accumulator" is a device that can collect and store ions. In examples, ions from a continuous or weak ion source can be collected in an accumulator and released as a pulse into an ion mobility separation system.

"AC" (alternating current) and "DC" (direct current) are used to describe sinusoidally varying and steady electrical excitations respectively. The terms can be applied to voltage or current signals. DC extends to quasi-static, slowly varying, or stepped waveforms. In some instances, DC and AC can overlap; usage can be dependent on whether the excitation source controls a specific voltage or current value at a specific time (termed DC) vs. controlling, e.g., amplitude and frequency (termed AC).

The terms "alignment" and "registration" refer to procedures or devices for positioning two or more objects in a desired spatial relationship with one another.

A "buffer" gas can be used as a background medium for ion mobility separation, and can provide varying collisional drag for different ion species. Buffer gases generally do not react chemically with ion species of interest. Nitrogen is a common buffer gas; however, other gases can be used.

A "channel" or "transport channel" is a region through which ions or a fluid can be transported, generally having one or more defined directions of travel, with confinement in directions orthogonal to the direction(s) of travel. The direction(s) of travel can be regarded as longitudinal direction(s), while the orthogonal directions can be regarded as transverse directions. In examples, confinement can be provided by electromagnetic and/or electrical fields developed by providing electrical or electromagnetic excitation to confinement electrodes. An elevator channel provides a transport path in an elevator, such as between levels of a multi-level SLIM apparatus. A separation channel provides transport with varying longitudinal speeds so that two or more species can be separated due to their differing speeds, i.e. by velocity dispersion. Two vectors can be considered to extend in a "common direction" if the angle between them is less than 90°, and can be considered "opposed to" each other if the angle between them is greater than 90°. (Surfaces can also be considered opposed, as described below.) Vectors can be "opposite" to each other if the angle between them is at least 150°. Examples of such vectors can be a central path along an ion transport channel, or a direction in which an elevator electrode bank (or the printed wiring board on which it is situated) extends outward from an associated structure.

"Confinement" refers to a phenomenon where ion motion or relative ion motion can be inhibited in one or more directions, or to procedures or devices associated with achieving this phenomenon. Longitudinal confinement refers to inhibition of motion or relative motion along an axis of ion transport. Longitudinal confinement can occur in a surfing mode traveling wave, wherein ions continue to move in a longitudinal direction, but cannot slip with respect to the traveling wave. Longitudinal confinement can also occur in devices such as accumulators or traps. Transverse confinement refers to inhibition of motion in directions orthogonal to an axis of ion transport. In some examples described herein, RF confinement or DC guard potentials or combinations can be used to achieve transverse confinement. Transverse confinement can occur independently of longitudinal confinement.

An "electrode" is a conductive object to which an electrical excitation can be applied or from which an electrical signal can be sensed. An electrode can be coupled to a proximate medium having lower conductivity than the electrode material. Some electrodes described herein can be used to define ion transport channels and can be implemented as electrically conductive patches on a printed wiring board. Particularly, electrodes can include electrodes providing DC guard potential, RF confinement, traveling waves, magnetic fields, or electric field gradients. Electrodes can be arranged in patterns or banks.

An "elevator" is a vertical channel coupling two or more horizontal planar SLIMs. That is, given two parallel planar SLIMs, a transport channel providing a direction of travel perpendicular to the SLIM planes can be dubbed an elevator. An elevator can operate continuously. For example, as ions are delivered to the elevator by a first traveling wave in one planar SLIM, they can be transported without delay, e.g. by a second traveling wave in the elevator, to a next planar SLIM, and can again be transported without delay by a third traveling wave in the next planar SLIM. Thus, ions can be transported through multiple levels continuously, e.g., without an ion packet being held still to wait during the transport of a previous ion packet through a channel. In different examples, the terms "vertical" and "horizontal" can be used relative to each other, the Earth, or other frames of reference or coordinate systems.

"Excitation" refers to a control signal applied to a device to control its functioning. Some examples described herein employ electrical excitation to electrodes of an ion manipulation system, in the form of a voltage or current signal. An electrical excitation can be static or quasi-static DC, a traveling wave, AC, RF, or combinations. Other forms of excitation include magnetic, which can generate induced currents, or electromagnetic, such as an optical or visible light beam.

"Extension" refers to a member that protrudes beyond the extent of an adjoining or proximate structure.

A "feedthrough" is a port through a surface by which a material (e.g. a gas) or a signal (e.g. an electrical excitation) can be passed through the surface.

"Fractionation" refers to a process for separating species according to a discriminating characteristic, such as ion mobility. Each separated species (or group of species) can be termed a fraction. Ion mobility separation can be used to isolate, collect, store, or further analyze selected fractions of an ion mixture.

A "gate" is a device or portion thereof whose state can be controlled over time in at least open and closed states. An example gate can apply electrostatic potentials to block (gate closed) or allow (gate open) flow of ions from one side of the gate to another.

Two devices or actions are "interchangeable" if they can be exchanged in an apparatus or method without affecting the functioning of the apparatus or method. Interchangeable devices or actions can, but need not, be identical. Even-numbered boards in a multi-layer board stack of an exemplary multi-level SLIM can be both identical and interchangeable.

An "ion" is an atom or molecule with a net electrical charge.

"Ion mobility separation" is a technique that can be based on differences in mobility of different ion species in a background medium such as a neutral buffer gas. In examples, ions experience a longitudinal electrical force in a direction of travel due to applied electric fields, with an opposing drag force due to collisions with buffer gas molecules. The resulting velocity, at which these forces are close to balance, can be species dependent, e.g., based on mass, charge, and shape of an ion species. The resulting velocity dispersion can be used to separate ion species as they are transported along a channel.

A "level" refers to a portion of a system defined by two surfaces, such as two parallel planes or planar devices. For example, each level of a three-dimensional ion mobility separation system can be defined between two printed wiring boards, and one or more ion transport channels can be defined by electrode patterns on the two boards, according to excitations applied. Where the excitation supports ion mobility separation, such a level can be termed a "separation level" or "ion mobility separation level."

The term "major surface" is a surface of a device whose area is not substantially exceeded by any other surface of the device. Common planar devices can have two planar major surfaces separated by the thickness of one or more substrates constituting the device.

A "mass spectrometer" (MS) is an apparatus for measuring a quantity and the mass to charge ratio of one or more species, discriminated by mass. Some types of MS include time-of-flight (TOF or TOF-MS) or quadrupole (QMS). A MS can be cascaded with another MS or with another analytic instrument.

A "motherboard" is a board having provisions for electrically or mechanically coupling to one or more other boards, sometimes termed "daughter boards." Any of the motherboard or the daughter boards can be printed wiring boards.

The terms "multi-layer" or "multi-level" refer to devices and systems organized as a plurality of planar layers or levels. A printed wiring board can be a multi-layer PWB. An ion mobility separation apparatus can be a multi-level ion mobility separation apparatus.

Two "opposed surfaces" face each other, e.g., across an ion transport channel. The term does not preclude having a coating over one or both surfaces, i.e., the surfaces need not be exposed.

"Parallel" lines or surfaces have an angle between them less than or equal to 10°, 5°, 2°, 1°, 0.1°, or 0.01°, etc.

A "path" is a generally linear track or route, position along which can be specified by a single coordinate. A path can be curved or folded to occupy a one-dimensional, two-dimensional, or three-dimensional extent. A path can have a finite width commonly less than one tenth the length along the path. Some paths described herein are ion transport channels, along which ions can be guided by suitable electromagnetic fields. Because of the finite width of such a path and variations in the initial conditions among the ions, ions traveling along such a path need not follow exactly the same trajectory.

A "planar" surface or device has a two-dimensional extent, which can be curved or flat (no curvature). A curved plane can have a continuously varying surface normal, i.e. no creases. A planar device commonly has a thickness at most one tenth its extent in any direction within its plane.

A "port" is a structure of a device by which a material (e.g. a gas) or a signal (e.g. an electrical excitation) can be introduced into or extracted from the device.

A "printed wiring board" (PWB) is a planar board having one or more surfaces on which electrical wiring is situated. A PWB can be fabricated using photolithographic techniques as are known in the electrical manufacturing art. A PWB can have a substrate material of fiber reinforced epoxy (e.g. FR4) or another low conductivity material. The electrical wiring can be formed of copper, nickel, tin, silver, or other metallic or non-metallic conducting materials. Some PWBs described herein can have electrode patterns on one or more surfaces for receiving electrical excitation and forming ion transport channels. Such a PWB can include wiring and connectors configured to couple electrical excitations (e.g. from a power supply or motherboard) to the various electrodes, and can also include a ground plane. Some PWBs described herein can also have electrodes formed on a sidewall, one dimension of which is the thickness of the PWB. The sidewall can be an exterior sidewall along a perimeter of the PWB, or can be a sidewall of an aperture in the interior of the PWB.

"RF" stands for radio frequency, covering a range from about 30 kHz to about 300 GHz (the RF frequency range), and is generally understood to refer to electromagnetic radiation and processes in that frequency range. "RF" is also used as an adjective to describe components, processes, quantities, or attributes thereof, that are operable at or associated with processes occurring at a frequency or range of frequencies within the RF frequency range.

"Serpentine" refers to a path or ion transport channel having multiple bends so as to pack a large path length in a small area or volume. In some examples, a serpentine path can have a length significantly greater than a maximum dimension of a containing area or volume. For example, a planar serpentine path can have a length at least 5, 10, 20, 50, or 100 times the maximum linear dimension of an enclosing boundary around the serpentine path. In some examples described herein, a stack of planar serpentine ion transport channels can be used to efficiently pack a composite ion transport path (tens or hundreds of meters, or even more) into a practical volume (less than 1 cm, 10 cm, or 1 meter on a side). In some examples, ions can be confined and guided along bends in the plane of the planar serpentine ion channels using RF and DC on side (guard) electrodes.

A "SLIM" is a Structure for Lossless Ion Manipulation. Some SLIMs described herein can provide an ion transport path defined by electrodes to which electrical or electromagnetic excitation can be applied. The SLIM can be generally linear (straight or curved), two-dimensional (straight or curved), or three-dimensional. A multi-level SLIM described herein can be formed by arranging multiple one- or two-dimensional SLIMs on successive layers of a three-dimensional structure, with ion transport channels arranged to couple the successive layers.

A "switch" is a device that can be controlled to guide ions over one of two or more paths.

The terms "top," "bottom," "up," "down," and the like are used for convenience, with respect to a given figure or a common configuration in which ion transport levels are generally horizontal. One of ordinary skill will understand from this disclosure that a choice of actual orientation can be varied without departing from the scope of the disclosed technologies.

"Transport" refers to a phenomenon or process of moving ions along a channel. In some examples, transport can be achieved by a balance of longitudinal electric fields and collisional drag with a background neutral buffer gas, however this is not a requirement. In other examples, buffer gas can be omitted, or streaming buffer gas can be used to accelerate ions.

A "trap" can refer to an apparatus for collecting or storing ions; the term "trap" can also be applied to a process for collecting or storing ions in such an apparatus.

A "traveling wave" (TW) refers to an electric potential waveform having at least one trough and at least one crest that propagates along a channel. Commonly, a traveling wave is formed by applying appropriate excitation to a series of electrodes disposed around the channel, and the TW designation can also apply to these excitations and these electrodes. When used for ion mobility separation, a TW can be continuous or can extend over multiple periods, however this is not a requirement. In other examples, a TW can be a single period (or even as little as half a period) of an oscillatory waveform. Multiple periods of a TW waveform can be regular or irregular, for example, stuttering or burst waveforms can be used in certain applications. When used for ion mobility separation, it can be desirable for the TW amplitude to be below a first threshold at which all ion species of interest can pass over crests from one trough to the next; such a configuration is considered to in "separation mode." For some elevator configurations, it can be desirable for the TW amplitude to be above a second threshold at which no ion species of interest can pass over a crest, i.e. all species of interest experience longitudinal confinement within the TW and can be carried by the TW at the TW speed; such a configuration is considered to be a "surfing mode." A TW amplitude that distinguishes surfing mode from separation mode can depend on frequency, wavelength, speed of propagation, or ion species. Some embodiments can be configured so that a surfing mode region is in a surfing mode for all ion species of interest, and a separation mode region is in a separation mode for all species of interest. For a given ion species, a transition between surfing mode and separation mode can also be made by changing the TW frequency while amplitude and wavelength are held fixed. In such a configuration, the TW can operate in separation mode above a threshold frequency, and in surfing mode below the threshold frequency. TW excitation and devices have been described, for example, in U.S. 2019/0004011A1, the contents of which are incorporated herein by reference.

"Wrap-around" refers to a configuration in which two members (such as vertical strokes of a letter "U") are joined by a third member (such as the bottom of the "U") that, with bends or folds, connects ends or edges of the first two members. Herein, joining can refer to members spaced apart slightly. For example, joined electrode surfaces can be joined and remain spaced apart slightly, such as by a distance comparable to an axial distance between TW electrodes so as to ensure field continuity.

Example Multi-Level Ion Manipulation Systems

FIG. 1 is a schematic diagram of an example multi-level ion manipulation system 100. As illustrated, a multi-level SLIM 105 can be coupled to receive ions from an ion injector 102, transport the ions through a succession of separation levels 111 and elevators 121 and deliver the ions to an ion receiver 108. Detailed insets 130, 150 of separation levels 111 and elevator 122 are also illustrated.

Generally, multi-level SLIM 105 can have an acceptance window, defined by a combination of spatial extent and angular divergence, such that ions received within the acceptance window can be efficiently transported through the multi-level SLIM 105. Ion injector 102 serves to provide ions within or matched to the acceptance window of multi-level SLIM 105, such that input losses of ions can be minimized. The ion injector 102 can include focusing or funneling ion optics. Ion funnels and focusing devices have been described, for example, in U.S. Pat. Nos. 9,824,874 and 10,332,723, the contents of which are incorporated herein by reference. In some examples, the ion injector 102 can include a source of ions such as an electrospray ion source, while in other examples, ion injector 102 itself receives ions from an external ion source, not shown. The ion injector 102 can also include a filter for separating ions from non-ion species. Such filters have been described, for example, in U.S. Pat. No. 9,558,925, the contents of which are incorporated herein by reference.

The acceptance window of multi-level SLIM 105 can also have temporal structure, such as a gated time interval, which can be repeated after a cycle time. To match the output of an ion source to an acceptance time interval, ion injector 102 can also provide an accumulation function as described further herein.

Multi-level SLIM 105 can be formed of an alternating sequence of separation levels 111, 112, ... 119 and elevators 121, 122, ... collectively forming an ion transport channel having greater path length, and hence better resolving power, than an ion transport channel defined by a single separation level, such as the separation level 111. Thereby, in one cycle of operation, a multi-species packet of ions received from injector 102 can be temporally separated into distinct pulses for each ion species, according to the ion species' respective mobilities.

Figure 2:
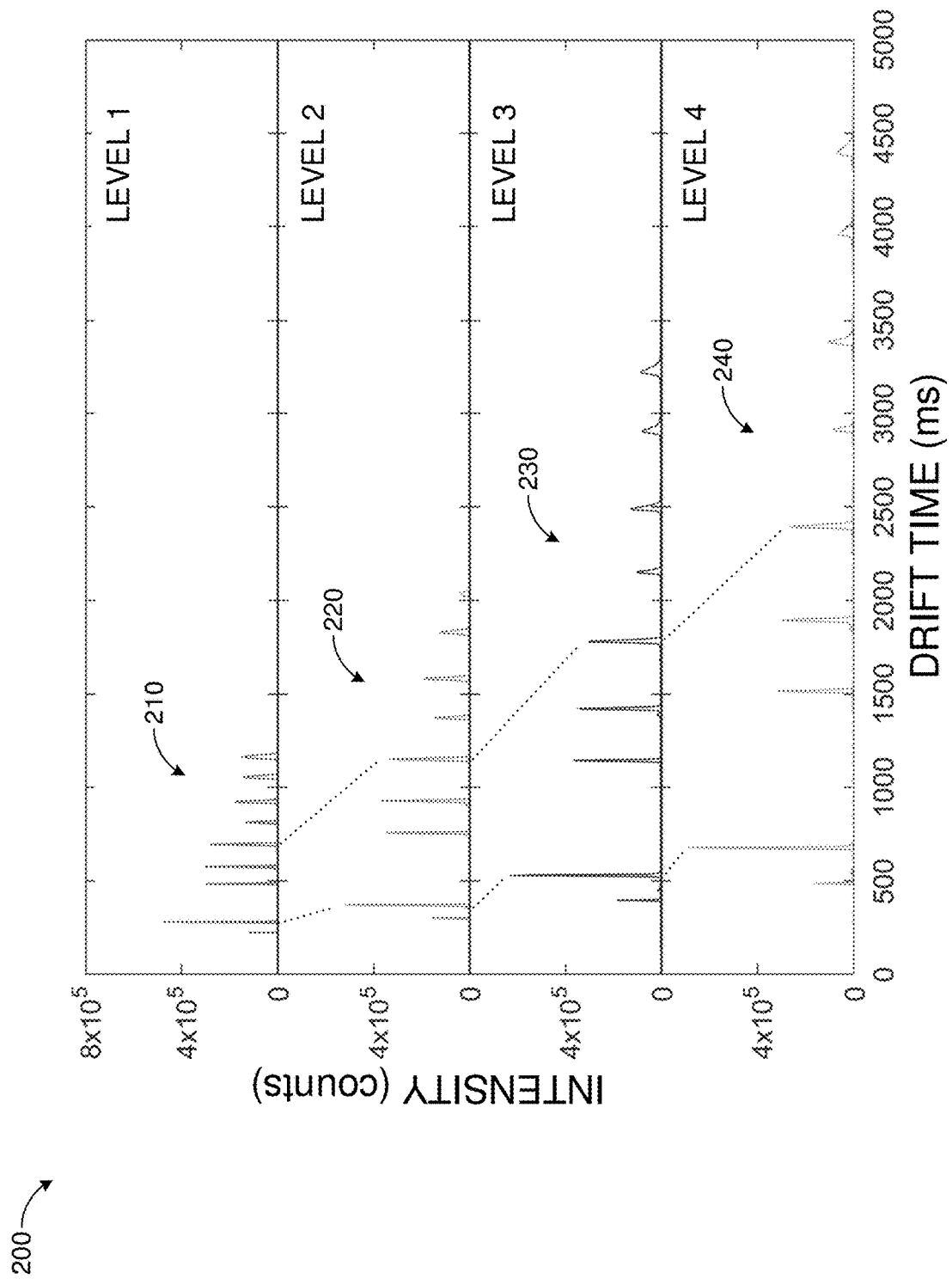
FIG. 2 is a graph showing results from an example multi-level ion manipulation system according to the disclosed technologies.

FIG. 2 is a graph 200 showing ion separation results from an example multi-level ion manipulation system. The top trace 210 shows separation of peaks after a single SLIM level; the peaks correspond to ion species having different mass-to-charge ratios (m/z). The subsequent traces 220, 230, 240 show progressively increasing separation of peaks after two, three, and four SLIM levels respectively. The resolving power can be seen to be greatly increased, with very little signal attenuation. In this example, the separated species have distinct m/z values, however this is not a requirement. In other examples, species with same m/z values but different shape can experience different collisional drag, can have different mobility, and accordingly can be separated.

Turning back to FIG. 1, an output pulse stream from multi-level SLIM 105 can be output to the ion receiver 108, where one or more ion species separated by the multi-level SLIM 105 can be further analyzed. In varying examples, ion receiver 108 can incorporate one or more traps for collecting respective ion species, a particle counter, a mass spectrometer, or another analytical instrument.

Inset 130 provides further detail of the separation level 111. Separation level 111 can be formed as a separation channel 135 from level input 132 to level output 138. In some examples, the separation channel 135 can be formed in a serpentine shape from the level input 132 to the level output 138, which can increase the path length of the separation channel 135 by using one or more bends to extend the separation channel 135 across a larger portion of an area of the separation level 111.

In representative examples, the separation level 111 can correspond to a first level of the multi-level SLIM 105, and the level input 132 can be coupled to ion injector 102. Level inputs of subsequent levels (e.g., above or below) of the multi-level SLIM 105 can be coupled to respective elevator exits so as to receive ions transported from preceding levels, and level outputs of subsequent levels of the multi-level SLIM 105 can be coupled to respective elevator entries so as to send ions to a succeeding level. A level output of a last level of the multi-level SLIM 105 can be coupled to ion receiver 108. In some examples, one or more other levels besides the last level can include an optional level output for coupling to the ion receiver 108, a different ion receiver, an ion dump, or another device.

Inset 130 shows further detail of a section of the separation channel 135. The separation channel 135 can be defined between electrode patterns 161, 162 on opposing surfaces. For simplicity of illustration, only the electrode patterns are shown in inset 130; the substrates on which these patterns are arranged are not shown. The electrode pattern 161 can be on an upper surface of a lower substrate (e.g. a printed wiring board), while the electrode pattern 162 can be on a lower surface of an upper substrate. The upper surface of the lower substrate and the lower surface of the upper substrate can be opposed to each other across the separation channel 135. In the illustrated example, electrode pattern 162 comprises guard electrodes 163, confinement electrodes 164, and rows 165 of traveling wave (TW) electrodes 166. The confinement electrodes 164 can be driven with RF excitation from an RF power supply 141, which can be configured so that alternating confinement electrodes 164 receive RF excitation with opposite polarity, and directly facing confinement electrodes 164 also receive RF excitation with opposite polarity. Thereby the set of four electrodes 164 which are shown connected to power supply 164 can provide transverse confinement for ions in separation channel 135. The remaining confinement electrodes 164 can be excited similarly; the additional wiring is omitted for clarity of illustration. Although the illustration shows the set of four electrodes 164 wired similar to an RF quadrupole, this is not a requirement, and other RF excitation patterns can also be used. According to the electrode geometry, in some examples facing RF electrodes can have a same polarity, or adjacent RF electrodes can have a same polarity. Phased excitations other than 0°, 180° can also be used. To aid in confinement and reduce transverse losses, guard electrodes 163 can be driven with a high positive voltage (for positive ions) relative to the voltages applied to electrodes 164, 166 so that ions drifting to the edge of the channel in the X direction can be repelled back towards the center of separation channel 135. In other examples, other confinement electrodes can replace the guard electrodes 163 to provide transverse confinement.

TW electrodes 166 can be driven by a multiphase power supply 142 providing an oscillatory sequence of signals to each TW electrode 166, phased in a pattern such that the electric potential in the separation channel 135 forms a traveling wave propagating in the +Z direction. As illustrated, eight phases of TW excitation can be used, but this is not a requirement. Fewer (e.g. 3, 4, 5, 6, or 7) or more (e.g. 9-16, 17-32, or even more) TW phasings can be used. Although wiring to only one row 165 is shown for clarity, all rows 165 of TW electrodes 166 around the separation channel 135 can be excited in phase, so that the electric potential traveling wave can propagate synchronously across the width (X direction) of separation channel 135. In some examples, electrode patterns 161, 162 (or portions) can mirror each other across the separation channel 135, with TW electrodes 166 of the electrode pattern 162 being in phase or receiving a common signal as associated TW electrodes of the electrode pattern 161 at common X, Z position across the separation channel 135.

Inset 150 provides further detail of the elevator 122 operated using traveling wave electrodes 151-154 receiving traveling wave excitation from elevator power supply 143. In some examples the elevator power supply 143 can be the same as or part of the multiphase power supply 142. A control device, such as a computer, controller, etc., can be coupled to or part of any of the power supplies to control electric potentials for the various electrodes, including ion gating, switching, DC and/or RF confinement potentials, and traveling wave sequencing, direction, amplitude, frequency, etc. Typically, a processor can execute computer readable instructions, stored in a memory, to carry out the control of electrode potentials and multi-level SLIM operation. The excitation pattern applied to electrodes 151-154 can define a traveling wave moving from bottom (peaking first at electrode 151) to top (peaking last at electrode 154). The labeling "TW2," "TW4," "TW6," indicates that electrode 151-154 peak in the order 2, 4, 6. Thus, the elevator 122 can provide a vertical transport channel indicated by arrow 175, for ions received horizontally (arrow 172) from the separation level 112 at elevator entry 171, the ions being delivered horizontally (arrow 178) to another horizontal SLIM level at elevator exit 179. In some examples, the elevator entry 171 and/or elevator exit 179 can be defined at positions other than the dashed ovals illustrated in the inset 150. For example, the elevator entry 171 or elevator exit 179 can be defined by other locations proximate the vertical transport channel such as above electrode 151, between electrodes 151, 152, between electrodes 151, 153, below electrode 152, between electrodes 152, 154, between electrodes 153, 154, etc. The shape or orientation of electrodes 151, 154 can be selected to smoothly vary the field pattern between the vertical elevator channel and the horizontal channels of the coupled SLIM levels. Thereby, ion losses can be minimized. Inset 150 shows four elevator electrodes for simplicity of illustration, however a different number of elevator electrodes can be used. Each electrode can be replicated multiple times in a direction perpendicular to the drawing page to increase the channel width. Additional elevator electrodes can be positioned between electrodes 151, 153 or between 153, 154. RF confinement electrodes can be interspersed between rows of elevator electrodes, similar to an electrode configuration used for separation channels. The increased number of elevator electrodes can provide a smoother field distribution at the entry 171, interior 175, or exit 179 of the elevator 122.

The multi-level SLIM 105 can be applied in various system configurations. A few exemplary configurations are described here.

Figure 3:
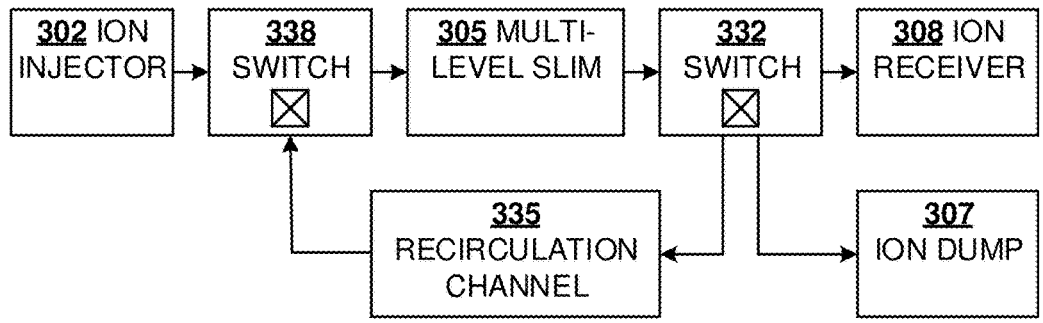
FIG. 3 is a schematic diagram of a second example multi-level ion manipulation system according to the disclosed technologies.

FIG. 3 is a schematic diagram of a second example multi-level ion manipulation system 300, having a multi-level SLIM 305 in a recirculating configuration to achieve higher overall separation channel lengths than can be achieved by a single pass through multi-level SLIM 305. Switches 332, 338 are ion transport devices that can be controlled to support any of multiple ion transport paths according to their states. Ion transport switches have been described, for example, in U.S. 2016/0071715A1 and U.S. 2019/0103261A1, the contents of which are incorporated herein by reference. In some examples, the states of switches 332, 338 can be controlled by suitable application of excitation signals to electrodes of the switches 332, 338.

Initially, a pulse of multiple species of ions can be introduced into the multi-level SLIM 305 from ion injector 302 with the switch 338 in a first state. Thereafter, the switch 338 can be switched to connect an output of recirculation channel 335 to an input of multi-level SLIM 305. After completing a transit through multi-level SLIM 305, the dispersed pulse of ions can exit from the multi-level SLIM 305, to be routed through switch 332 to an input of recirculation channel 335. After passing through the recirculation channel 335, the ions can be routed through switch 338 back to the input of multi-level SLIM 305 for another transit through the multi-level SLIM 305. In this fashion, the ions can complete multiple passes (tens, hundreds, or thousands of passes) until a stopping criterion is met. The stopping criterion can be a predetermined number of transits, a predetermined time, or a predetermined duration of the separated pulse train. When the stopping condition is reached, the switch 332 can be reconfigured so that some or all of the separated ions can be extracted to the ion receiver 308.

The recirculation channel 335 or the switches 332, 338 can be integrated into a common board assembly with the multi-level SLIM 305. In an example where multi-level SLIM is a stack of planar SLIMs and the ion transport path traverses the levels from bottom to top, the switches 332, 338 can be integrated into the top and bottom SLIM levels respectively, and the recirculation channel 335 can be an express elevator coupling the top and bottom SLIM levels together directly.

Moreover, the illustrated system need not be limited by a race condition wherein the head of a separated pulse train (with highest mobility ions) can catch up to the tail of the separated pulse train (with lowest mobility ions). This race condition can be avoided by suitable gated control of switch 332 or 338. For example, if the ion transit time through multi-level SLIM 305 varies from 10 to 20 ms, and the ions of particular interest have a transit time of 14.0 ms, then switch 332 can be controlled to direct ions exiting the multi-level SLIM 305 into the recirculation channel 335 between 13.0 and 15.0 ms, and to direct ions into an ion dump 307 at other times. By synchronizing the gated control with the round-trip transit time of a desired ion species (including passage through the switches 332, 338 and the recirculation path 335), the recirculating configuration illustrated can filter out all but the desired ion species over a sufficient number of transits.

Numerous variations are possible. For example, multiple ion groups can be recirculating through the system at the same time, with care taken to avoid having high mobility ions from one group catch up with low mobility ions of a preceding group. To illustrate, in a 40 level SLIM, three distinct groups of ions could be present at levels 3-4, 13-14, 22-25, and 31-36 simultaneously.

Figure 4:
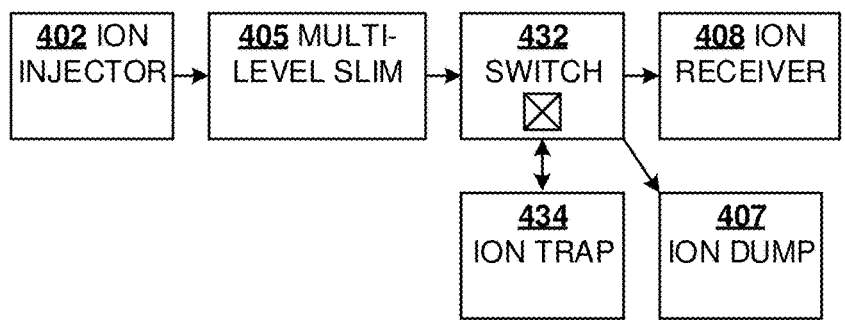
FIG. 4 is a schematic diagram of a third example multi-level ion manipulation system according to the disclosed technologies.

In another configuration, FIG. 4 is a schematic diagram of a third example multi-level ion manipulation system 400, in which one or more selected ion species can be collected in ion trap 434 over multiple cycles of operation. For each cycle, a group of ions can be introduced into multi-level SLIM 405 from ion injector 402. If the desired ion species have a transit time of 14.0 ms, then switch 432 can be controlled to switch ions into the ion trap 434 from 13.5 ms to 14.5 ms, while at other times, ions exiting the multi-level SLIM 405 can be routed to ion dump 407. Thus, as cycles continue to take place, the population of desired ions in trap 434 can build up. When a stopping criterion has been met (such as a predetermined number of cycles, a predetermined time, or a predetermined stored charge in the ion trap 434), the cycling operation can be terminated and the collected ions can be extract from the ion trap 434, through switch 432 and into ion receiver 408 for further analysis.

Numerous variations are possible. Distinct switches can be used for loading and extracting ions. Multiple distinct ion traps can be used to collect respective species of separated ions. Stored ions in ion trap 434 can be cooled, for example, by electric or magnetic field control and adiabatic expansion, or with a laser.

Figure 5:
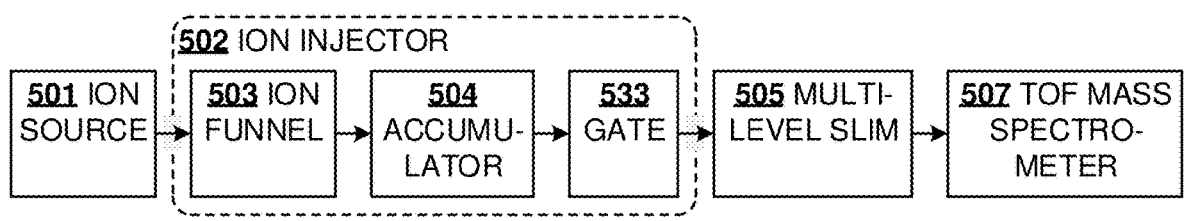
FIG. 5 is a schematic diagram of a fourth example multi-level ion manipulation system according to the disclosed technologies.

In a further configuration, FIG. 5 is a schematic diagram of a fourth example multi-level ion manipulation system 500 employing a front-end accumulator 504 and delivering ions to a TOF mass spectrometer 507. Integration of ion mobility separation with a mass spectrometer has been described, for example, in U.S. Pat. No. 9,939,409, the contents of which are incorporated herein by reference. Ions from an ion source can be passed through an ion funnel 503, to match their spatial and angular distribution to be within an acceptance window of the accumulator 504, and thereafter collected in the accumulator 504. During collection, gate 533 can be maintained in a closed state. Once a release criterion has been met, gate 533 can be opened to extract ions from accumulator 504 and deliver a pulse of the ions into an entrance of multi-level SLIM 505. Exemplary release criteria can be a predetermined collection time, a predetermined stored charge within accumulator 504, or a ready state of TOF mass spectrometer 507 or another ion receiver similar to ion receiver 408. Together, ion funnel 503, accumulator 504, and gate 533 can be parts of ion injector 502 for this example. Other ion injectors can also be used.

The configuration of FIG. 5 supports repetitive, cyclic operation of the multi-level SLIM 505 or the ion receiver 507, and can provide required higher signal amplitudes from a weak continuous ion source.

Example Elevators

Figure 6A:
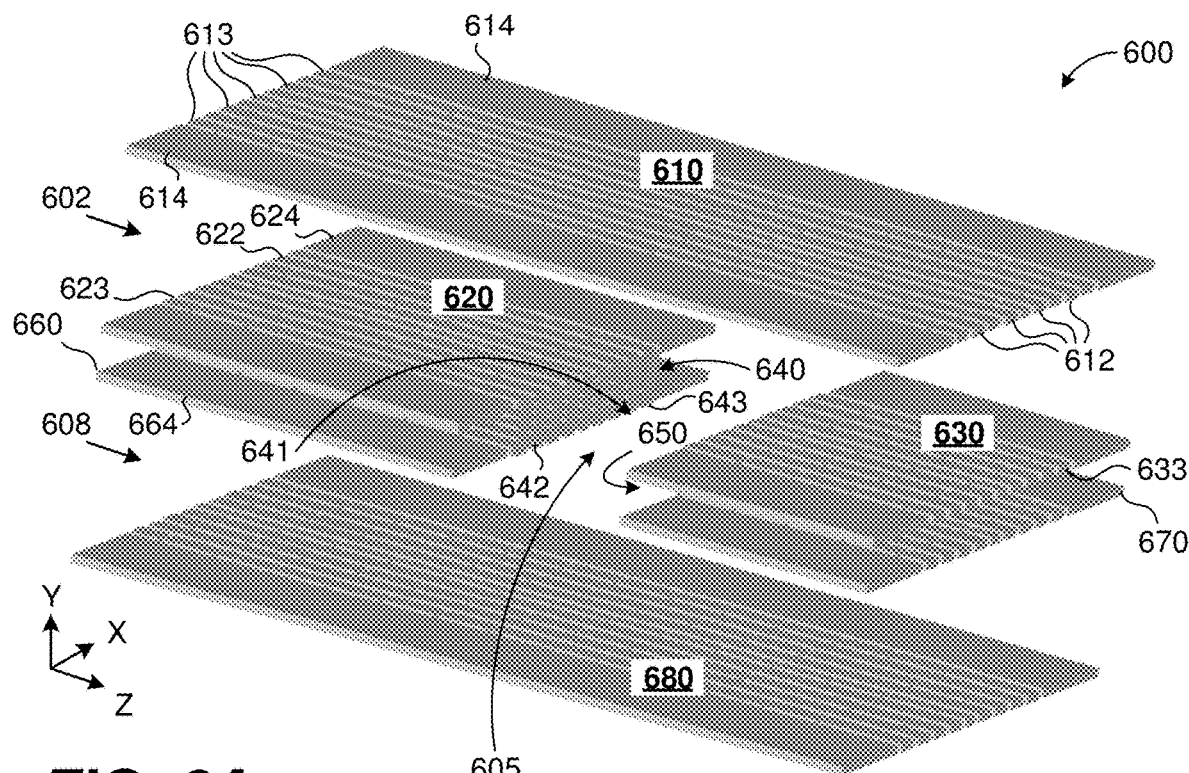
FIGS. 6A-6B are oblique and schematic views illustrating a first example elevator according to the disclosed technologies.
Figure 6B:
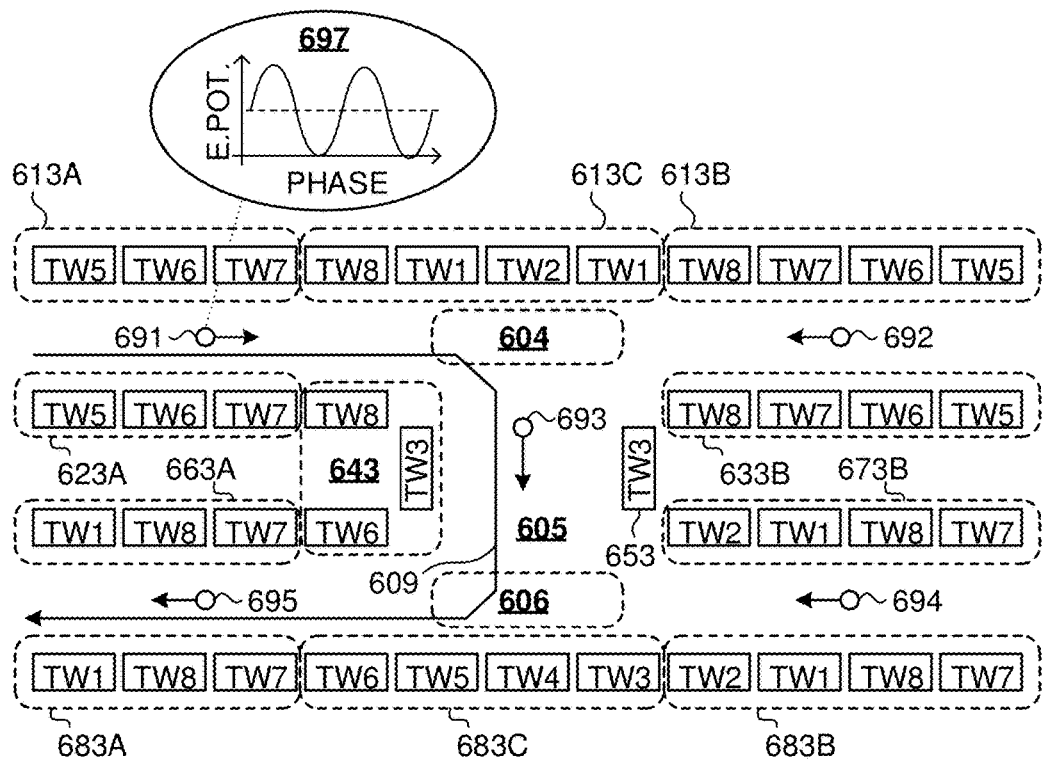

FIGS. 6A-6B illustrate a first example elevator configuration 600. FIG. 6A is an oblique, exploded illustration of eight banks 610-680 of electrodes associated with this elevator. A first ion transport level 602 can be defined between electrode banks 610, 620, 630. A second ion transport level 608 can be defined between electrode banks 660, 670, 680. An elevator transport channel 605 can be defined between electrode banks 640, 650, together with portions of banks 610, 680 as described further below. For clarity of illustration, FIG. 6A shows only electrode banks 610-680 without substrates supporting these electrode banks 610-680 or the electrical wiring through which suitable excitation signals can be provided to the electrode banks 610-680. For example, electrode bank 610 can be mounted on the underside of a top substrate (not shown), within which electrical wiring can provide excitation signals to the electrodes of bank 610. Similarly, bank 680 can be affixed to an upper surface of a bottom substrate (not shown). An intermediate substrate can support and provide electrical connections for the remaining electrode banks 620-670: banks 620, 630 can be on an upper surface of the intermediate substrate; banks 660, 670 can be on a lower surface of the intermediate substrate; and banks 640, 650 can be on facing sidewalls of an aperture 641 in the intermediate substrate. The location of bank 650 is indicated in FIG. 6A, however the bank 650 itself is substantially hidden from view.

Within bank 610, RF confinement electrodes 612 are arranged to alternate with rows 613 of traveling wave electrodes, all of which are arranged between guard electrodes 614. The electrode banks 620, 630, 660, 670, 680 are similar. For example, bank 620 can have RF confinement electrodes 622 alternating with rows of 623 of traveling wave electrodes, arranged between guard electrodes 624.

Together, the electrodes 612-614 of bank 610 and the electrodes 622-624 of bank 620 define an ion transport channel between the substrate surfaces on which banks 610, 620 are situated. Provided with RF excitation in alternating polarity or another phasing, electrodes 612, 622 can provide transverse confinement in this channel using the principle of an effective potential resulting from time-varying out-of-phase RF waveforms, while electrodes 614, 624 can provide a transverse DC potential well for additional transverse confinement. Phased traveling wave excitation applied to TW electrodes in the rows 613, 623 can generate a traveling wave propagating toward the elevator 605. Rows 633 of traveling wave electrodes of electrode bank 630, along with traveling wave electrodes of rows 613 can be operated similarly to generate a traveling wave propagating toward the elevator 605 in an opposite direction. Thus, in FIG. 6A, the rows 623 can have a phased TW excitation along the +Z direction, the rows 633 can have a phased TW excitation along the −Z direction, and the rows 613 can have both a phased TW excitation along the +Z direction for a subset of the TW electrodes of the electrode bank 610 and a phased TW excitation along the −Z direction for another subset of the TW electrodes. Because the traveling waves reaching elevator 605 are opposed, the ion transport channel between electrode banks 610, 620 can terminate at the entrance of elevator 605.

Bank 640 has RF confinement electrodes 642 alternating with TW electrodes 643. In the illustrated example, bank 640 has no guard electrodes corresponding to guard electrodes 624, 664, while in other examples guard electrodes 624, 664 can wrap around on the interior sidewall(s) of aperture 641. RF confinement electrodes have been described, for example, in U.S. Pat. No. 10,224,194, the contents of which are incorporated herein by reference.

FIG. 6B illustrates a traveling wave excitation pattern for elevator configuration 600, for a vertical cross-section in the YZ plane through one of the rows 613 of traveling wave electrodes and associated traveling wave electrodes in other banks. The traveling wave electrodes can be phased as indicated by the labeling: "TW5" indicates traveling wave excitation ("TW") with a relative phase of 5. The numbers 1-8 indicate the relative phase of a traveling wave excitation, so that TW2 has peaks shortly after TW1, TW3 peaks shortly after 2, and so forth. In the illustrated example, eight phases of traveling wave excitation are used, corresponding to about 45° phase shift between successive phases; TW1 follows TW8 and is equivalent to TW9.

In ion transport level 602, electrodes 613A, 623A can be excited in the phased relationship shown, so that an electric potential traveling wave 691 (illustrated in an inset 697; the other traveling waves depicted in FIG. 6B can be similar) travels from left-to-right in the left hand side of the illustrated cross-section of ion transport level 602. The amplitude and velocity of traveling wave 691 can correspond to a separation mode, and ion transport level 602 can be an ion mobility separation level. Ions can be guided by traveling wave 691 to the elevator transport channel 605. Meanwhile, electrodes 613B, 633B can be excited in the phased relationship shown, to form an electric potential wave 692 traveling from right to left toward the elevator channel 605. Generally, no ions may be introduced from the right side, however the traveling waves 691, 692 traveling in opposite directions meet head-on and produce a squeezing, proximate to the entrance 604 of elevator 605, that can help to reduce ion losses as ions navigate the elevator transport channel 605. In some examples, the excitations or amplitudes of traveling waves 691, 692 can be equal, however this is not a requirement. In varying examples, traveling waves 691, 692 can independently be in separation mode, surfing mode, or in between.

In like fashion, the TW electrodes 663A, 683A can be excited to generate a traveling wave 695 from right-to-left, so that ions emerging from the bottom of elevator channel 605 can be transported toward the left in ion transport level 608 as shown. TW electrodes 673B, 683B can also create a right-to-left traveling wave 694 to reduce ion losses. Like traveling wave 691, traveling wave 695 can be in separation mode, and ion transport level 608 can be an ion mobility separation level.

The elevator transport channel 605 can be defined by TW electrode 643 along the inside of a turning ion path represented by line 609, and TW electrodes 613C, 653, 683C are phased as indicated to provide a traveling wave 693 that is generally continuous in phase with the traveling waves of electrodes 613A, 623A in ion transport level 602, and electrodes 663A, 683A in ion transport level 608. Traveling wave 693 can propagate orthogonally to the XZ extent of level 602. Elevator channel 605 can also include RF confinement electrodes such as RF confinement electrode 642 in banks 640, 650. The traveling wave phasings illustrated in FIG. 6B are illustrative, and other phasings can be used. For example, the TW1-TW2-TW1 phasing in electrode bank 613C can alternatively be TW1-TW2-TW3, which can result in traveling waves 691, 692 meeting to the right of center in FIG. 6B. TW electrodes 613C can also include an even number of TW electrodes or an odd number other than three. Similar or different phasings and/or quantities can be provided for TW electrodes 683C.

In examples, the amplitude of traveling wave 693 can be set higher than the amplitudes of traveling waves 691, 695, and can be in a surfing mode to provide better containment of ions along the bends of the ion path from level 602, through elevator channel 605, and into level ion transport 608. Line 609 is a representation of an ion path through the illustrated elevator configuration. The extension of electrode banks 643, 613C, 683C to the left of the vertical portion of elevator channel 605 into the ion transport channels between electrode banks 610, 620 and electrode banks 660, 680 can provide lower loss transitions between surfing mode TW in the elevator channel and separation mode TW 691, 695. In some examples, the transition extension of electrode banks 643, 613C, 683C can extend at least one electrode segments into one or both the ion transport channels between electrode banks 610, 620 and 660, 680. In further examples, the electrode banks 643, 613C, 683C can extend a quarter period, a half period, three-quarters period, one TW wavelength, two TW wavelengths or more (e.g., with one TW wavelength being eight electrode segments in the illustration of FIG. 6C).

In examples, electrode banks 620, 630 can be on a common surface, with elevator channel 605 passing through an aperture in this surface (which can also define the aperture 641, by way of example). The elevator channel 605 can receive ions from the ion transport channel of level 602 at elevator entrance 604, and can discharge ions into the ion transport channel of ion transport level 608 at elevator exit 606.

Figure 7A:
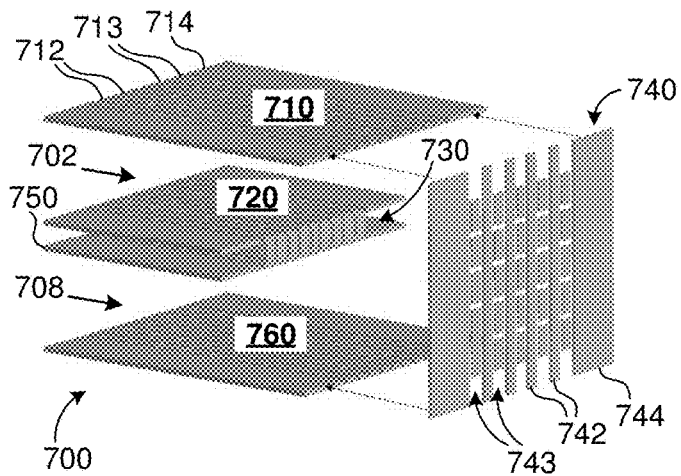
FIGS. 7A-7B are breakaway and assembled oblique views illustrating a second example elevator according to the disclosed technologies.
Figure 7B:
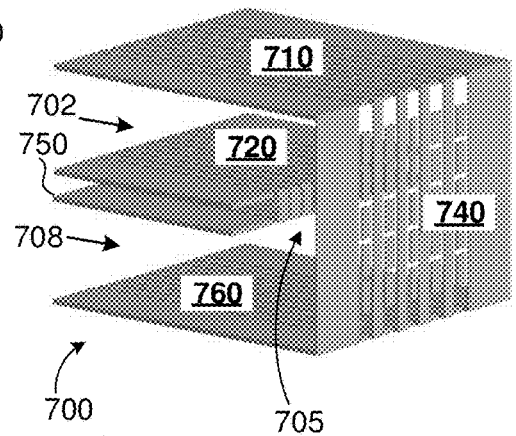
Figure 7C:
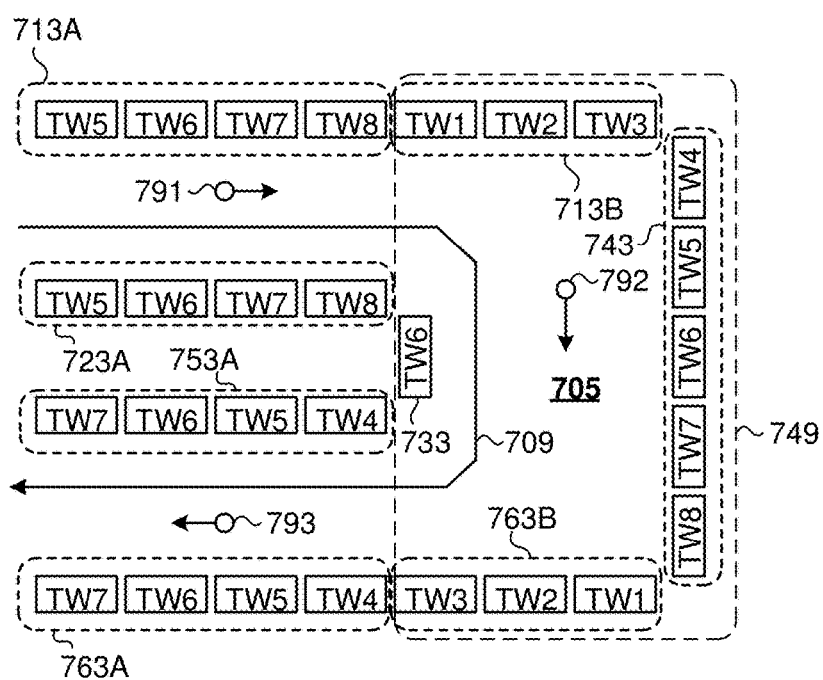
FIG. 7C is a schematic view of the example elevator of FIGS. 7A-7B.

A second example elevator configuration 700 is illustrated in FIGS. 7A-7C. FIG. 7A is an oblique, exploded illustration of six electrode banks 710-760 forming patterns of electrodes associated with this elevator configuration 700. A first ion transport level 702 can be defined between electrode banks 710, 720. A second ion transport level 708 can be defined between electrode banks 750, 760. On each of these levels, a planar (e.g. serpentine) ion transport channel can be defined by banks of electrodes arranged on opposed surfaces. An elevator transport channel 705 can be defined between electrode banks 730, 740, together with portions of electrode banks 710, 760 as described further below. For clarity of illustration, FIGS. 7A-7B show only electrode banks 710-760 without substrates supporting these electrode banks 710-760 or the electrical wiring through which suitable excitation signals can be provided to the electrode banks 710-760. For example, electrode bank 710 can be fabricated on the underside of a top substrate (not shown), within which electrical wiring can provide excitation signals to the electrodes of electrode bank 710. Similarly, electrode bank 760 can be affixed to an upper surface of a bottom substrate (not shown). An intermediate substrate can support and provide electrical connections for the intermediate electrode banks 720, 730, 750: electrode banks 720, 750 can be on an upper surface and a lower surface, respectively, of the intermediate substrate, while electrode bank 730 can be on an exposed sidewall of the intermediate substrate. Electrode bank 740 can likewise be arranged on a substrate in a vertical plane, which can be situated in a fixed relation such as by being joined with the substrates supporting electrode banks 710, 760 as indicated. In some examples, electrodes in electrode banks 710 and/or 760 can be electrically coupled to electrodes in the electrode bank 740. FIG. 7B is a similar view of the assembled elevator configuration. Electrode bank 740, together with portions of electrode banks 710, 760, forms a wraparound elevator electrode configuration, opposite to electrode bank 730. Any of these substrates can be printed wiring boards.

The electrode patterns on the various electrode banks 710-760 are generally similar, including RF confinement electrodes (712, 742, etc.) and guard electrodes (714, 744, etc.), both providing transverse confinement, along with rows of TW electrodes (713, 743, etc.).

FIG. 7C illustrates a traveling wave excitation pattern for the elevator configuration 700, for a vertical cross-section through one row of traveling wave electrodes 713 and corresponding traveling wave electrodes in other banks. The traveling wave electrodes can be phased as indicated by the labeling, with electrode excitation or the corresponding electric potential traveling wave successively peaking at TW1, TW2, TW3, . . . TW7, TW8, TW1, . . . . In ion transport level 702, electrodes 713A, 723A can be excited in the phased relationship shown, so that an electric potential traveling wave 791 travels from left-to-right in the FIG. 7C. The amplitude and velocity of traveling wave 791 can correspond to a separation mode. Ions can be guided by traveling wave 791 to the elevator transport channel 705. In like fashion, the TW electrodes 753A, 763A can be excited to generate a traveling wave 793 from right-to-left, so that ions emerging from the bottom of elevator channel 705 can be transported toward the left in ion transport level 708 as shown.

The elevator transport channel 705 can be defined by TW electrode 733 along the inside of the turning ion path, and TW electrodes 713B, 743, 763B phased as indicated to provide a traveling wave 792 that is generally continuous in phase with the traveling waves 791, 793. In examples, the amplitude of traveling wave 792 can be set higher than the amplitudes of traveling waves 791, 793, and can be in a surfing mode to provide better containment and lower losses for ions traveling along the bends of the ion path 709 from level 702, through elevator channel 705, and into level 708. The phasing of the TW electrodes shown in FIG. 7C is exemplary; other phasings can also be used. Dashed line 749 encloses elevator electrodes 713B, 743, 763B and the elevator channel 705.

Another example elevator configuration 800 is illustrated in FIGS. 8A-8B. FIG. 8A is an oblique, exploded illustration of seven electrode banks 810-870 forming patterns of electrodes associated with this elevator configuration 800. A first ion transport level 802 can be defined between electrode banks 810, 820. A second ion transport level 808 can be defined between electrode banks 830, 870. On each of these levels, a planar (e.g. serpentine) ion transport channel can be defined by banks of electrodes arranged on opposed surfaces. An elevator transport channel 805 can be defined between vertical electrode banks 840, 850, together with horizontal electrode bank 860 as described further below. Electrode banks 840, 850 can be located on a pair of opposed surfaces extending outward from the surfaces of electrode banks 810, 870. These surfaces can be orthogonal to the surfaces of electrode banks 810, 870, and can be parallel to the directions 872, 878 along which ions enter the elevator 805 from level 802, or exit the elevator 805 into level 808. The electrode arrangements of electrode banks 840, 850 can be symmetric about the elevator channel 805.

For clarity of illustration, FIGS. 8A-8B show only electrode banks 810-870 without substrates supporting these electrode banks 810-870 or the electrical wiring through which suitable excitation signals can be provided to the electrode banks 810-870. For example, electrode bank 810 can be mounted on the underside of a top substrate (not shown), within which electrical wiring can provide excitation signals to the electrodes of electrode bank 810. Similarly, electrode banks 860, 870 can be affixed to an upper surface of bottom substrates (not shown). An intermediate substrate can support and provide electrical connections for the intermediate electrode banks 820, 830. Electrode banks 840, 850 can likewise be arranged on respective substrates in a vertical plane, which can be joined with the substrates supporting electrode banks 810, 860, 870 as indicated. FIG. 8B is a similar view of the assembled elevator configuration. Electrode banks 840, 850, together with electrode bank 860, define an extension elevator configuration. An electrode bank similar to electrode bank 860 can be positioned opposite electrode bank 860, e.g., with a mirrored electrode configuration, to form a boxed top for the electrode banks 840, 850, 860. For example, the electrode bank similar to electrode bank 860 can be situated in a common plane and extend from the electrode bank 810. The elevator 805 can have an open end as shown, or a guard electrode can form an end, such as by extending the guard electrode 854 between the electrode banks 840, 850.

The electrode patterns on the various electrode banks 810-870 are generally similar, including RF confinement electrodes (812, 852, etc.), guard electrodes (814, 854), providing transverse confinement of ions, and rows of TW electrodes (813, 853, etc.).

Figure 8C:
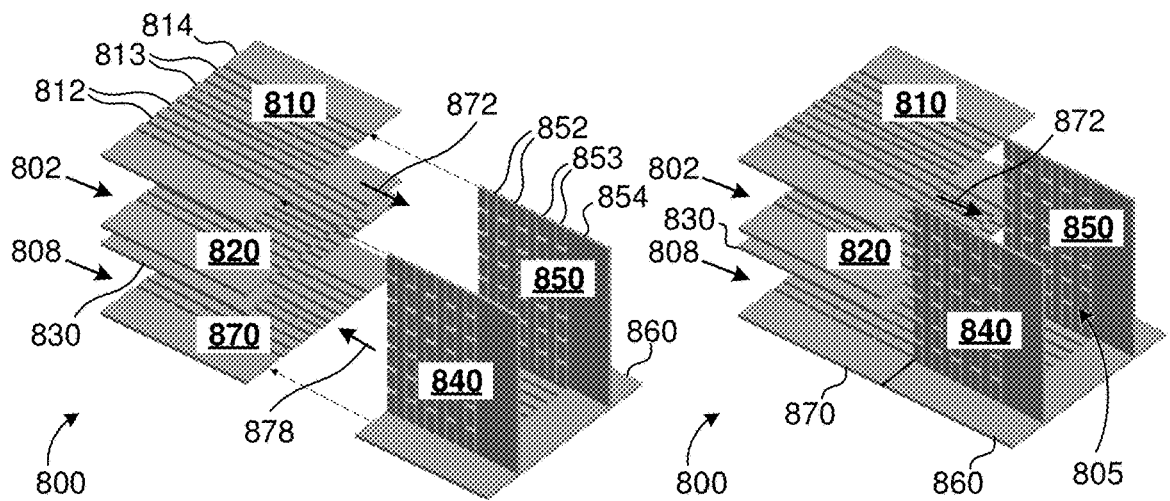
FIG. 8C is a schematic view of the example elevator of FIGS. 8A-8B with some variation.
Figure 8C:
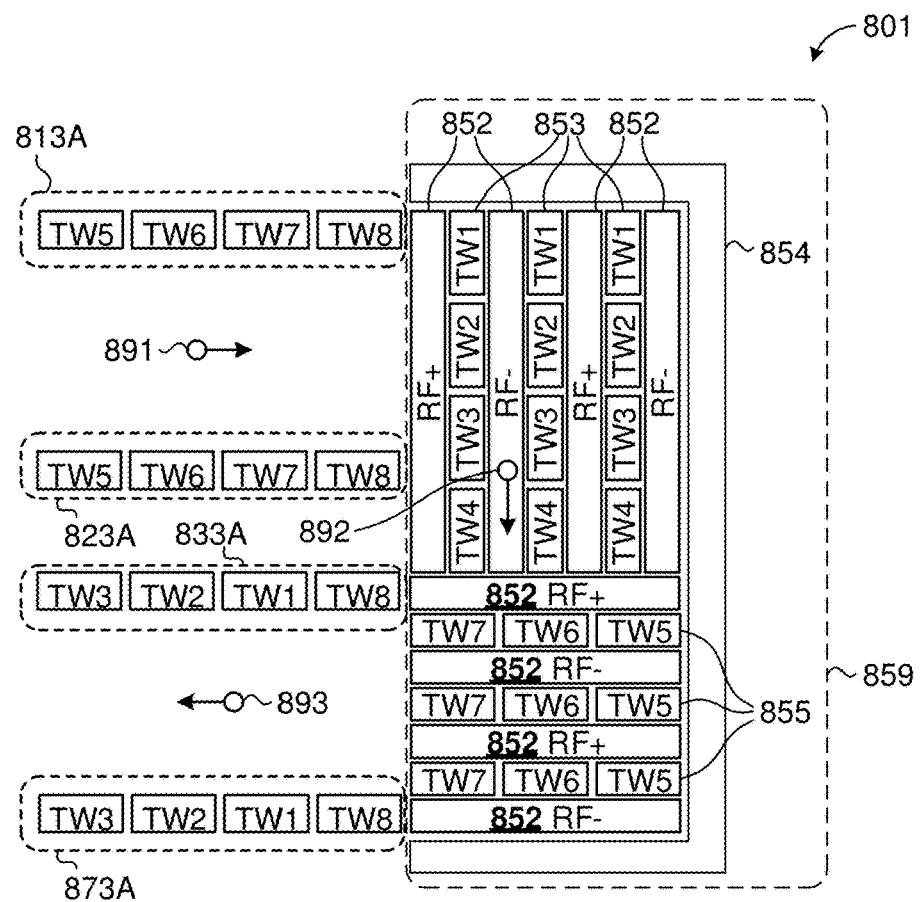

FIG. 8C is a schematic view of an elevator 801 similar to that of FIGS. 8A-8B, and illustrates a traveling wave excitation pattern for the elevator 801, for a vertical cross-section through one row of traveling wave electrodes 813 and corresponding traveling wave electrodes in other electrode banks 820, 830, 870. Also shown is an electrode arrangement in dashed line 859 which can correspond to the electrode bank 850 but with electrode pattern alternative to that shown in FIGS. 8A-8B. The traveling wave electrodes can be phased as indicated by the labeling, with electrode excitation or the corresponding electric potential traveling wave successively peaking at TW1, TW2, TW3, . . . TW7, TW8, TW1, . . . . In ion transport level 802, electrodes 813A, 823A can be excited in the phased relationship shown, so that an electric potential traveling wave 891 travels from left-to-right in FIG. 8C. The amplitude and velocity of traveling wave 891 can correspond to a separation mode. Ions can be guided by traveling wave 891 to the elevator transport channel 805. Then, TW electrodes 853 can be excited to generate a traveling wave 892 propagating from top-to-bottom and TW electrodes 855, 833A, 873A can be excited to generate a traveling wave 893 propagating from right to left, so that ions emerging at the bottom of elevator channel 805 can be transported toward the left into ion transport level 808 as shown. In FIG. 8C, guard electrodes 854 and RF confinement electrodes 852 of elevator electrode bank 850 are also shown. The electrode pattern of electrode bank 840 can be symmetric to that of electrode bank 850, with matching excitations provided for guard and TW electrodes, and opposite phase excitations for RF confinement electrodes. Electrode bank 860 is not shown in FIG. 8C; the TW electrode excitations on electrode bank 860 can match those of electrode bank 855, or can be phase continuous with the excitations of bank 873A. In some examples, guard electrodes can be provided on electrode bank 860. A representative ion path is not shown in FIG. 8C but can be similar to path 709 of FIG. 7C. The phased sequencing TW1-TW7 for the TW electrodes 853 of the electrode banks 840, 850 in the elevator configuration 800 can follow the straight rows of TW electrodes 853 from top to bottom as shown of FIGS. 8A-8B, instead of changing direction as shown in the elevator 801 in FIG. 8C.

In examples, one or both of traveling waves 892, 893 can be in surfing mode to provide better containment and lower losses for ions along the bends of the ion path from level 802, through elevator channel 805, and into level 808.

Example Multi-Layer Ion Transport Configuration

Figure 9A:
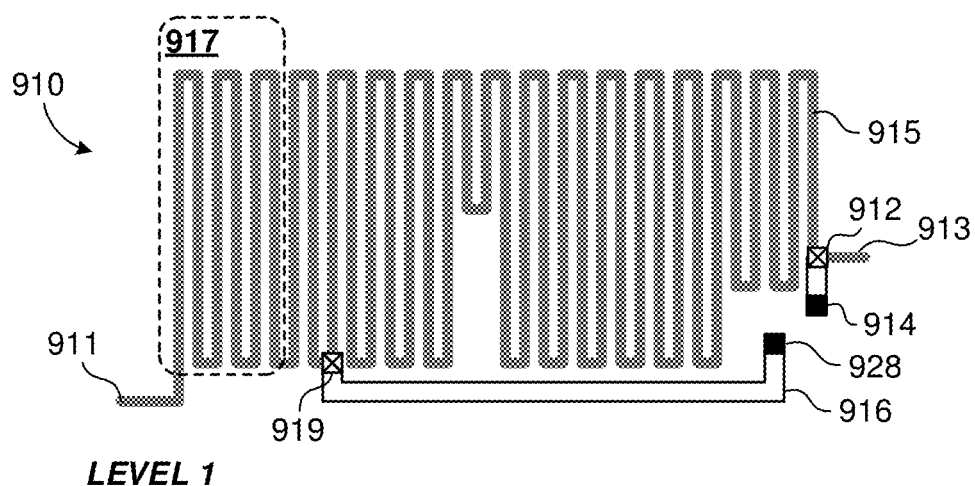
FIGS. 9A-9B is an illustration of an example multi-level transport path according to the disclosed technologies.
Figure 9A:
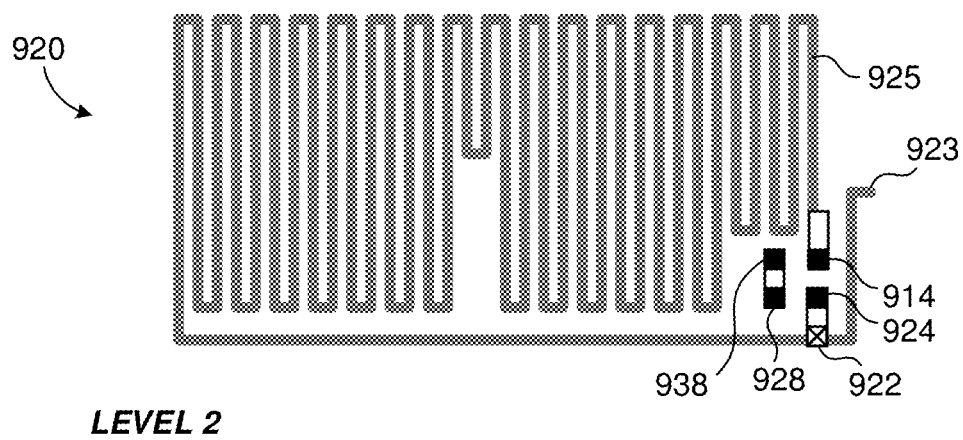
Figure 9A:
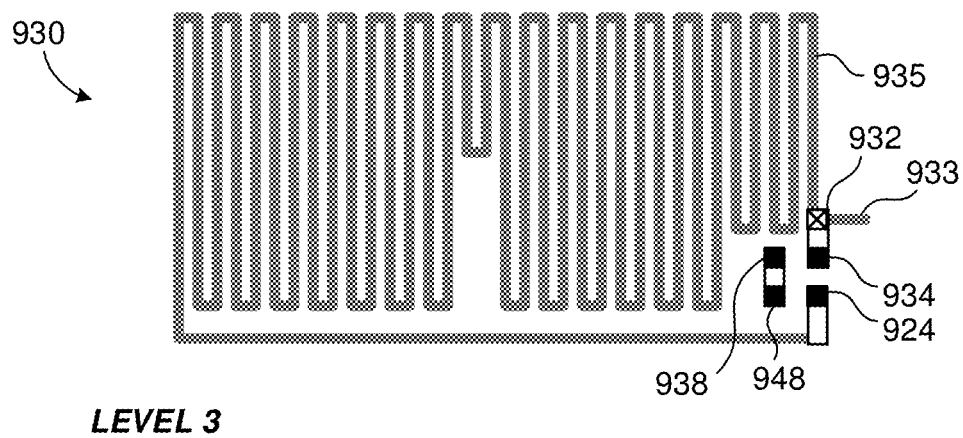
Figure 9B:
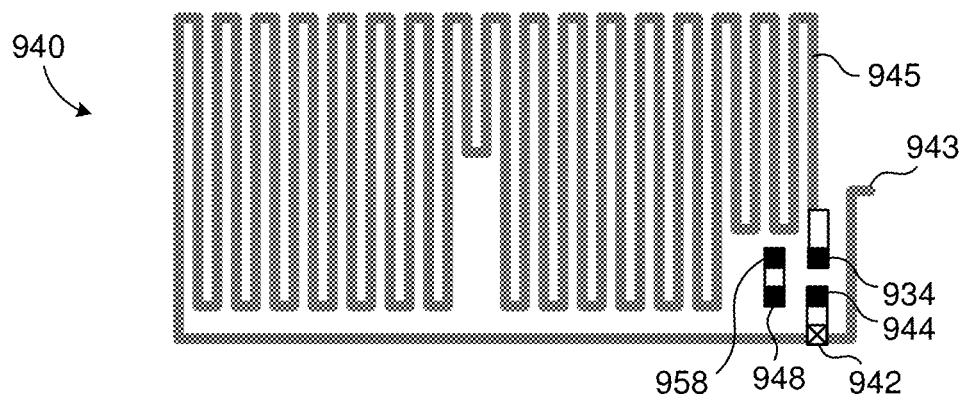
Figure 9B:
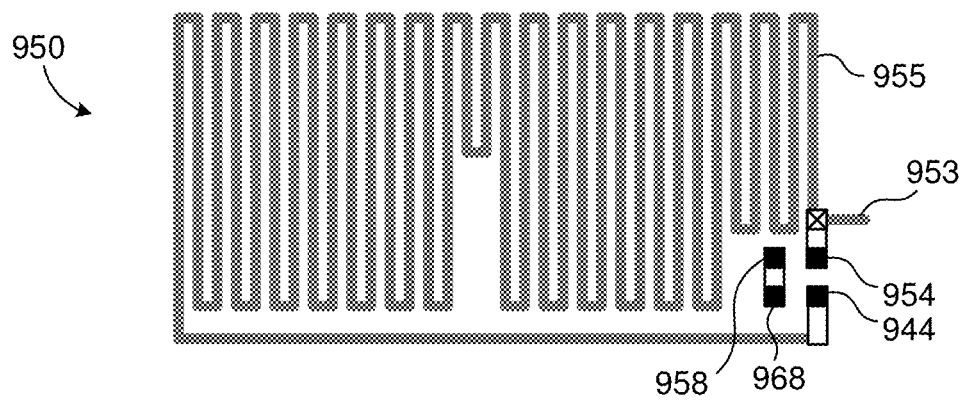
Figure 9B:
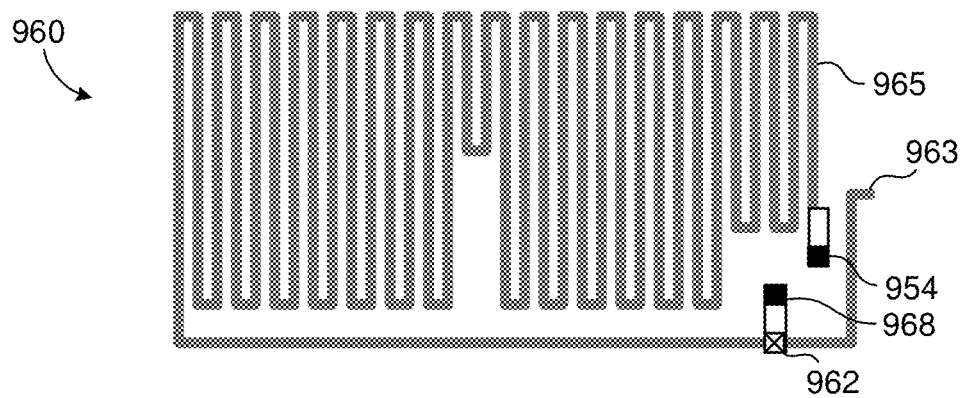

FIGS. 9A-9B illustrate an example multi-level transport channel 900 according to the disclosed technologies. At level 1, ions can enter transport channel segment 910 at entrance 911 and can follow the illustrated serpentine path 915, having about 30 legs and a corresponding number of bends to reach switch 912 (shown as an X). Depending on the state of switch 912, ions can be extracted at exit 913 or can be routed to elevator 914 (shown with solid fill), to emerge on ion transport level 2. On level 2, ions can follow serpentine path 925 of ion transport channel segment 920 to reach a switch 922. Similar to level 1, the ions can be extracted at exit 923 or can be routed to elevator 924 to level 3. On level 3, ions can follow serpentine path 935 of ion transport channel segment 930 to reach switch 932. Here, similar to level 1, ions can be extracted at exit 933 or can be routed to an elevator 934.

Levels 4 and 5 can have ion transport channels 940, 950 be substantially similar to those of levels 2 and 3 respectively. Ions can enter these levels from a preceding level at elevators 934, 944 and follow serpentine paths 945, 955 to switches 942, 952 where, dependent on individual settings of switches 942, 952, the ions can be extracted at exit points 943, 953, or guided to a next level via elevators 944, 954.

Elevator 954 can guide ions to level 6, the highest level in this illustration. Similar to levels 2 or 4, ions can enter level 6 at elevator 954, and follow serpentine path 965 of ion transport channel 960 to reach switch 962. According to the setting of switch 962, ions can be extracted at exit 963 or sent back toward level 1 via elevator 968.

Elevator 968 can be the first of a chain of elevators 968, 958, 948, 938, 928 leading back to level 1 for recirculation. At levels 5, 4, 3, 2, elevators 968, 958, 948, 938 are respectively coupled to another elevator 958, 948, 938, 928. Following this chain of elevators, recirculating ions can emerge at level 1 via elevator 928, and can be transported through a recirculation channel 916 to switch 919. In a first state, switch 919 can be configured to pass ions from entrance 911 towards switch 912 along serpentine path 915. In a second state, for recirculation, switch 919 can be configured to direct ions from recirculation channel 916 through the serpentine path 915 towards switch 912. Thus, with suitable control of switches 932, 919, ions can be recirculated through a multi-level SLIM, an arbitrary number of times, limited by the head of a burst of ions catching up to its tail, or by transport losses.

The illustrated six-level structure can readily be extended by introducing additional pairs of levels similar to levels 2 and 3. Alternating levels can have substantially similar layout, according to the direction of ion flow. Thus, in a 16-level stack, levels 2, 4, 6, 8, 10, 12, 14 can have substantially similar layouts, while levels 3, 5, 7, 9, 11, 13, 15 can have substantially similar layouts, with levels 1 and 16 having configurations similar to those of levels 1 and 6 illustrated in FIG. 9. In other examples, levels 4 and 5 can be omitted to obtain a four level stack. In further examples, a modification of the topmost level (level 6 in FIG. 9B) can allow the topmost level to mate directly with an even-numbered level (e.g. levels 2 or 4 as illustrated), enabling stacks to be built with an odd number of total levels. In further examples, intermediate levels can include unused electrodes and/or switches of a final level such that the final level can have a layout similar or identical to even or odd intermediate levels.

Each level can be situated between a pair of printed wiring boards, and the ion transport channel on a given level can be defined by electrode patterns and associated excitations on the opposed surfaces of these wiring boards. A given board can provide electrode patterns for two levels on its upper and lower surfaces respectively. In such examples, a number of boards N can form N−1 levels of transport channels. A board between levels 2 and 3 can have an even numbered level above it and an odd numbered level beneath it, just like the board between levels 4 and 5. Inasmuch as the even numbered levels 2, 4, 6, . . . can have similarly laid out ion transport channels, and the odd numbered levels 3, 5, 7, . . . can also have similarly laid out ion channels, the board between levels 2 and 3 can be substantially similar to the board between levels 4 and 5. In the same way, the board between levels 3 and 4 can be substantially similar to the board between levels 5 and 6. Alternating boards away from the top and bottom of a multi-level device can be substantially similar. Substantially similar boards can have identical electrode patterns, can be interchangeable, or can be identical. To illustrate, with two boards at each end of a stack of boards defining an entry level and an exit level of a multi-level ion transport stack, four or more remaining boards in the middle can be arranged as an alternating stack of even-numbered and odd-numbered boards. In some examples, a first board can define a lower surface electrode layout of a first level and a second board can define an upper surface electrode layout of the first level and a lower surface electrode layout of a second level, and each additional board can be one of two boards arranged alternately so that a multi-level stack of two or more levels (typically at least three, and up to an arbitrary number) can be formed using only the four board types. In some examples, multi-level ion apparatus can be scalable. For example, longer path lengths can be achieved by inserting additional PWBs into available slots to define additional levels.

While most of the ion transport paths 910, 920, 930 illustrated can employ a common TW excitation in separation mode, some variations can be introduced. In some examples, at least one of the elevator sections 914, 924, . . . can employ surfing mode to reduce ion losses. In some examples, the surfing mode can be extended a short distance into an adjoining horizontal transport channel (as indicated by clear filled section 916 to distinguish from shaded separation mode channels such as 915), and similarly for other elevators. An initial region 917 of level 1 can be configured as an accumulator, or a region of level 2 can be configured as a CRIMP region (Compression Ratio Ion Mobility Programming). Ion compression and CRIMP have been described, for example, in U.S. Pat. No. 10,018,592 and Deng et al., "Compression Ratio Ion Mobility Programming (CRIMP) Accumulation and Compression of Billions of Ions for Ion Mobility-Mass Spectrometry Using Traveling Waves in Structures for Lossless Ion Manipulations (SLIM)," Anal. Chem. vol. 18, no. 12, pp. 6432-6439 (2017), the contents of which are incorporated herein by reference.

While switches 912, 922, etc. can provide flexibility in operation, in other examples operation can be simplified by eliminating unnecessary switches. For example, in a 100 level apparatus, switches 912, 922, 932 can be eliminated on some or all 100 levels; exit ports 913, 923, 933 can correspondingly be eliminated on levels 1-99 and continuing elevator 924 can be eliminated on level 100.

ADDITIONAL EXAMPLES

Numerous variations of multi-level ion manipulation systems can be built with the disclosed technologies. Any of the configurations of FIGS. 6A-6B, 7A-7C, 8A-8C can be stacked repeatedly with ion transport channels on successive levels coupled by successive elevators 605, 705, or 805. For example, the top levels 602, 702, 802 of one instance of the depicted configurations can be a bottom level 608, 708, 808 of another instance. A combination of elevator types can be used in a single multi-level system. Additionally, the ion transport channels in any level (e.g. the channel between banks 610, 620 or between banks 660, 680) can be extended in their respective levels to form serpentine channels as shown in FIG. 9.

Examples of the disclosed technologies can include power supplies, similar to those shown in FIG. 1, coupled to provide RF excitation to RF confinement electrodes (e.g. 612), DC excitation to guard electrodes (614), or traveling wave excitation to TW electrodes (613).

Some examples of the disclosed technology can couple an ion mobility separation channel operating in separation mode with an ion elevator channel operating in surfing mode. In the separation channel, ions can be guided and separated with a traveling wave electric potential in a separation mode. The ion elevator channel can couple ions from the separation channel into another ion mobility separation channel. In some examples, portions of the ion mobility separation channel proximate to the ion elevator channel can operate in a surfing mode with remaining portions of the ion mobility separation channel operating in separation mode. For example, at least one TW set (a repeating pattern) can be arranged before an elevator entrance to be operating in surfing mode. The TW set can be the same in the separation channel and the elevator or can be different. In a particular example, an 8-electrode set can be used in the separation channel and elevator region. In an alternative example, an 8-electrode set is used in the separation channel and a 4-electrode set in the elevator.

Example Ion Transport Modes

Figure 10A:
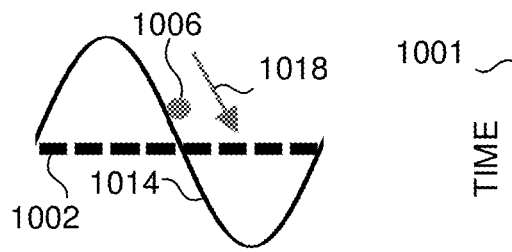
FIGS. 10A-10D are diagrams illustrating ion transport in a traveling wave electric field, in separation mode.

FIGS. 10A-10D are a time series of diagrams illustrating ion transport of a given ion species in a traveling wave electric field, in separation mode. FIGS. 10A-10D are arranged with time increasing downward along the page, as shown by arrow 1001. Referring to FIG. 10A, traveling wave electrodes 1002, arrayed in a longitudinal direction, can be configured to generate a potential waveform 1014 at a first time of the time series. Ion 1006 can be a representative positively charged ion of a particular species. Due to a local potential gradient, the ion 1006 can experience a force towards the negative potential region, as illustrated by arrow 1018.

Figure 10B:
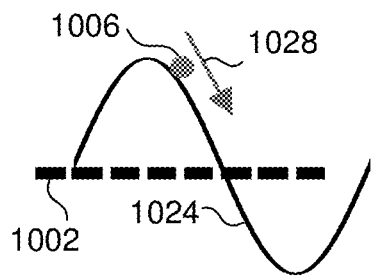
Figure 11B:
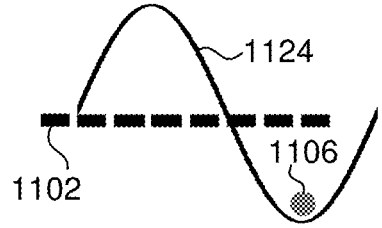
Figure 10C:
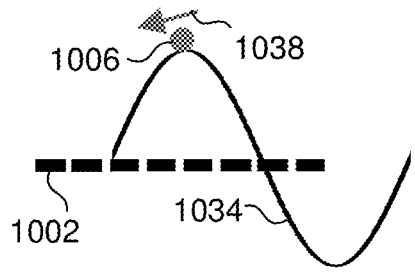
Figure 11C:
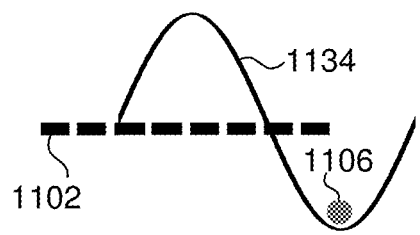
Figure 10D:
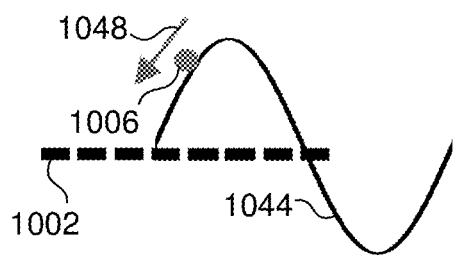
Figure 11D:
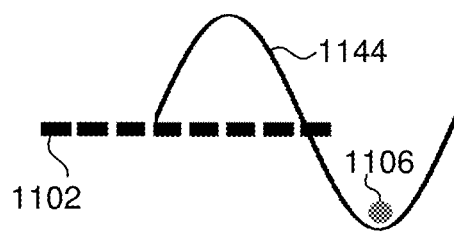

FIGS. 10B-10D represent successive snapshots in time at which the TW potential waveforms 1024, 1034, 1044 are progressively shifted to the right by about one electrode between each pair of snapshots. In FIG. 10B, the crest of waveform 1024 has almost reached ion 1006, which still experiences a force 1028 toward the right. In separation mode, ion 1006 can have sufficient velocity not to be trapped within a well of the traveling waveform 1024. Thus, at the next snapshot shown in FIG. 10C, the crest of waveform 1034 has passed the ion 1006, which now can experience a modest force 1038 toward the left. As the traveling wave 1044 continues moving to the right, another snapshot is shown in FIG. 10D, with ion 1006 experience a stronger force 1048 toward the left, on the trailing slope of potential waveform 1044.

In FIGS. 10A-10D, an array of eight longitudinally spaced TW electrodes can be configured, by suitable wiring and stimuli, to generate one period of a sinusoidal TW waveform, however these are not requirements. In varying examples, more or less than eight electrodes per TW wavelength can be used, or a non-sinusoidal waveform can be used. Non-sinusoidal waveforms can include periodic and quasi-periodic waveforms, with varying amounts and phasing of harmonic content.

Figure 11A:
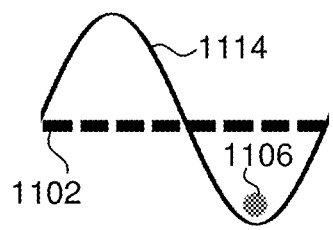
FIGS. 11A-11D are diagrams illustrating ion transport in a traveling wave electric field, in surfing mode.

FIGS. 11A-11D illustrate surfing mode with a time series of diagrams similar to FIGS. 10A-10D. As before, time increases downward along the page, following arrow 1001. Referring to FIG. 11A, traveling wave electrodes 1102, arrayed in a longitudinal direction, can be configured to generate a potential waveform 1114 at a first time of the time series. Ion 1106 can be a representative positively charged ion of a particular species, and is shown situated at about the minimum potential position of the waveform 1114.

In surfing mode, the amplitudes of the voltage waveforms of FIGS. 11A-11D can be greater than in FIGS. 10A-10D (that is, the potential amplitude scale can be different between FIGS. 10A-11D). As a result, ion 1106 can have insufficient energy to cross over the crest of waveform 1114 from one potential well to the next. Ion 1106 can be trapped in the potential well, and can be thought of as surfing along the wave 1114. This can be seen in successive snapshots FIGS. 11B-11D. As the potential waveform 1124, 1134, 1144 progressively shift to the right, ion 1106 can maintain its position relative to the TW waveform 1124, 1134, 1144.

Separation mode and surfing mode can be controlled by setting the amplitude of TW excitation voltages applied to TW electrodes. Below a first threshold excitation voltage, all ion species of interest can overcome the potential barrier of the traveling wave, and ion mobility separation can be achieved. Above a second threshold excitation, all ion species can be confined by the potential barrier of the traveling wave, and can surf on the traveling wave, traveling at the wave speed and eventually settling at respective phases of the traveling wave, where collisional drag and electric field acceleration are balanced. Alternatively or additionally, separation and surfing modes can be controlled by setting the frequency or propagation speed of the TW excitation. In some examples described herein, surfing mode can be advantageous for transport segments to minimize ion losses e.g. while entering or exiting an elevator. For excitation above the first threshold but below the second threshold, a traveling wave can be in an intermediate mode, with some ion species experiencing mobility separation and some ion species surfing.

FIGS. 10A-11D are presented from the perspective of a positive ion Similar modes can be experienced by negative ions.

Example Assembly

Figure 12A:
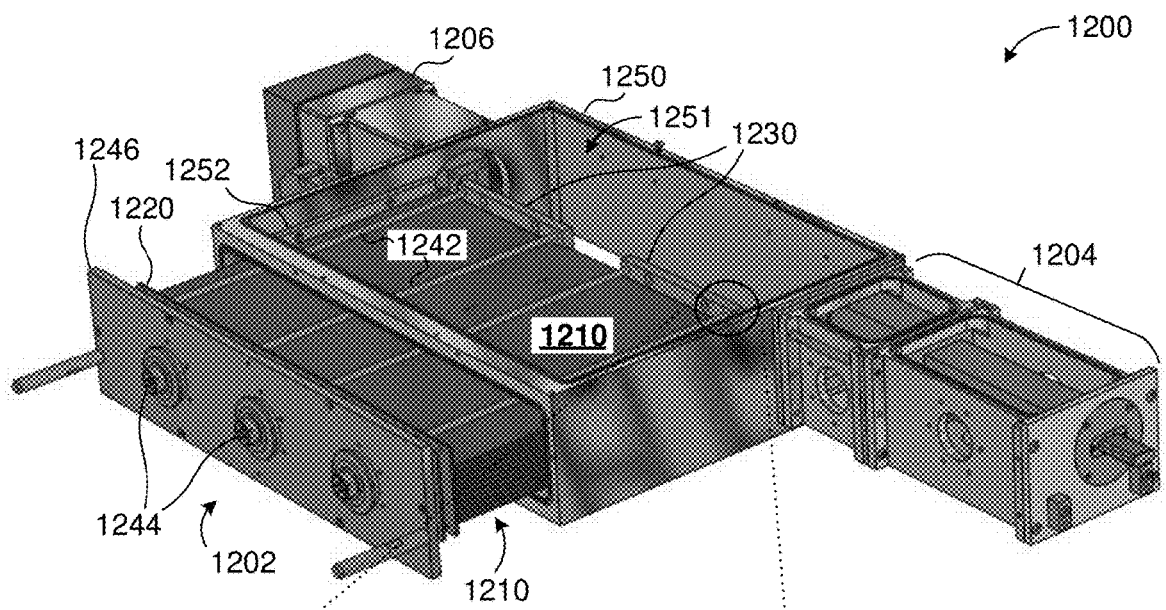
FIG. 12A is an oblique view of a partially assembled fifth example multi-level ion manipulation system according to the disclosed technologies.

FIG. 12A is an oblique view of a partially assembled fifth example multi-level ion manipulation system 1200 according to the disclosed technologies. Printed wiring boards 1210 (PWBs) can be retained in a spaced apart configuration within a frame joining motherboard 1220 and one or more spacer blocks 1230 with mechanical members such as connecting rods 1242. Feedthroughs 1244 in front panel 1246 can attach to the motherboard 1220 to introduce excitation signals from external power supplies (not shown) to the illustrated multi-level ion manipulation system. The spacer blocks 1230 can include slots to support surfaces of the PWBs 1210.

The PWBs 1210 can be individually mated with the motherboard 1220 (e.g. with card edge or other connectors, not shown, on the motherboard 1220) to provide electrical connection paths from the feedthroughs 1244 via motherboard 1220 to individual electrodes (not shown) on the PWBs 1210. In some examples, the electrical connection between PWBs 1210 can also provide mechanical fixturing of the PWBs 1210 at the motherboard 1220, while in other examples, flexible cabling can be used for electrical connections to the PWBs 1210, and other fasteners or spacer blocks 1230 can be used to establish the spaced apart configuration at the motherboard end of the PWBs 1210. Individual electrodes of the example multi-level ion manipulation system 1200 can be configured in various ways for confinement and transport, including DC, RF, traveling wave, static, etc., but selected examples can include electrode arrangements according to any example or combination of examples disclosed herein.

Together, front panel 1246, feedthroughs 1244, the frame (e.g., motherboard 1220, connector rods 1242, spacer blocks 1230), and the PWBs 1210 can be manufactured as a subassembly 1202. As illustrated, subassembly 1202 can be inserted into a housing 1250 that can define a chamber 1251 that can be held under to vacuum with additional members (including a lid which is not shown) to provide an air-tight seal for the chamber 1251. Housing 1250 can be fitted with guides 1252 to facilitate insertion, removal, or positioning of subassembly 1202 within the ion manipulation system 1200. The guides 1252 can also provide support for the PWBs 1210. In some examples, the guides 1252 can be parallel slots. In some examples, the subassembly 1202 can form a drawer that can be inserted into the housing 1250. Also coupled to the chamber 1251 are ion injector 1204 and an ion receiver 1206, which can be coupled to a mass spectrometer. The ion injector 1204 can be coupled to receive ions from an ion source.

Figure 12B:
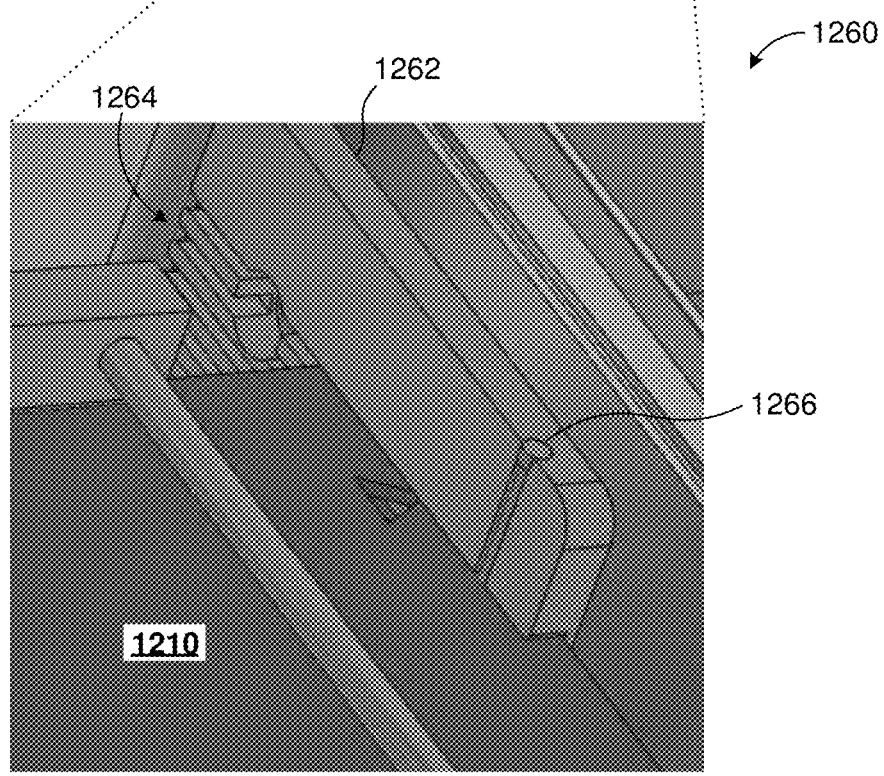
FIG. 12B is a detail view of the example multi-level ion manipulation system of FIG. 12A.

FIG. 12B is a detail view 1260 of the example multi-level ion manipulation system of FIG. 12A. A spacer block 1262 is illustrated with parallel slots 1264 which can receive respective PWBs 1210. An alignment pin 1266 can be inserted into an alignment hole in at least one of the PWBs 1210 (and more typically through corresponding alignment holes in all of the PWBs 1210) to establish transverse positioning of one or more of the PWBs 1210 with respect to the spacer block 1262. In examples, the alignment pin 1266 can also be used to align the PWBs with respect to each other. Other spacer blocks 1230 can be similarly configured. With the spacer block 1262 secured to or in relation to the housing 1250, the PWBs 1210 in an aligned position with the alignment pin 1266 can be aligned to other orifices associated with, e.g., the ion injector 1204, ion receiver 1206, vacuum couplings to the chamber 1251, etc. Other alignment mechanisms can also be used, including detents, fasteners, clips, etc.

Method of Use

Figure 13:
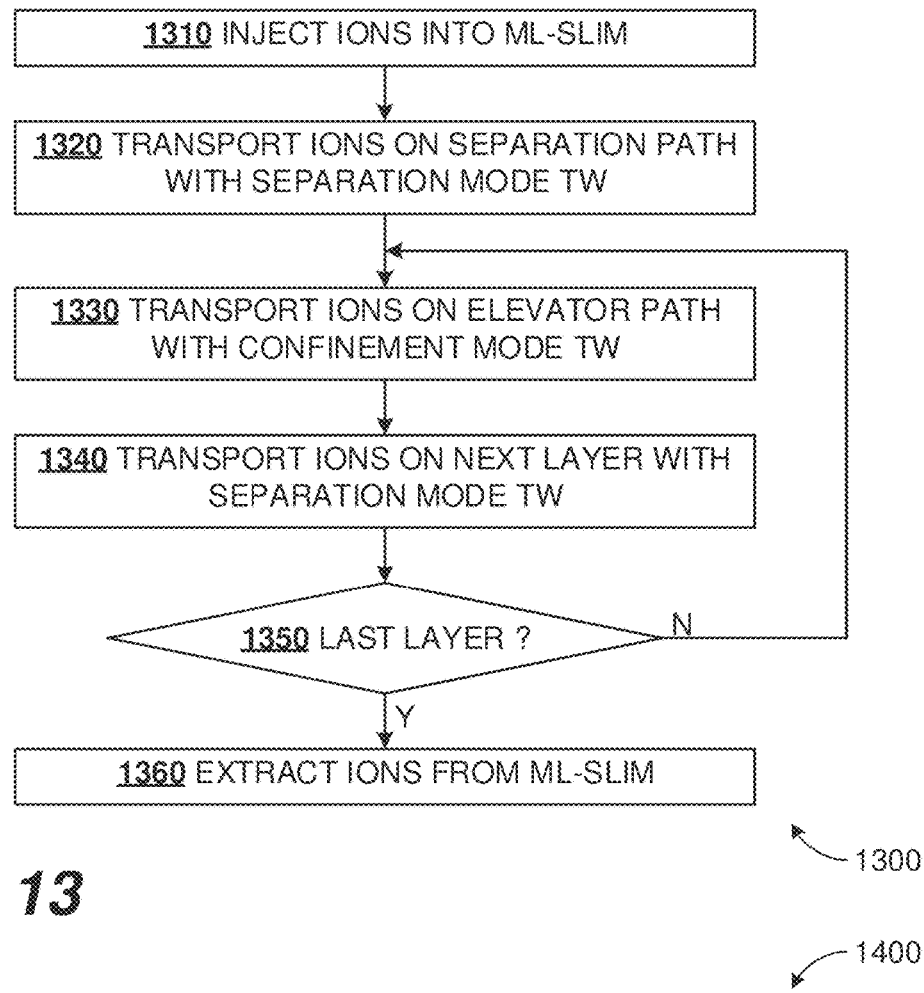
FIG. 13 is a flowchart of an example ion manipulation method according to the disclosed technologies.

FIG. 13 is a flowchart of an example ion manipulation method 1300 according to the disclosed technologies. Ions can be transported along successive layers of a multi-layer ion path, guided by traveling wave (TW) electric field patterns in a separation mode. Between successive layers of the multi-layer ion path, the ions can be transported along elevator channels, guided by TW electric field patterns in a surfing mode.

At process block 1320, the ions can be transported on a separation path (e.g., in one layer of the multi-layer SLIM) using one or more traveling waves in separation mode. Upon exit from this separation path, at process block 1330, the ions can be transported on an elevator path (e.g., to a next layer of the multi-layer SLIM) using a traveling wave in surfing mode, following which one or more traveling waves in separation mode can be used to transport the ions along the next layer of the multi-layer SLIM, at process block 1350. The flowchart 1300 branches at decision block 1350 according to whether this next layer is the last (e.g. topmost) layer of the multi-layer SLIM. If there are additional layers to be transited, the method follows the N branch back to process block 1330, where the ions can be transported using an elevator to another layer of the multi-layer SLIM. However, if there are no more layers to be transited, the method follows the Y branch to process block 1360, and the ions are extracted from the multi-layer SLIM. Extraction of ions from a separation path has been described, for example, in U.S. Pat. No. 9,939,409, the contents of which are incorporated herein by reference.

Numerous variations and features can be realized. The use of surfing mode in the elevator channels enables ion transport between layers without any static DC field along the elevator channels. A long channel operating in surfing mode can inhibit velocity separation of ion species, however this effect can be kept small in a short elevator channel between adjacent layers of a multi-layer SLIM. Nevertheless, to the extent that velocity separation between ion species can be reduced within the elevator channel, the velocity separation between ion species can be restored after passing through an elevator channel, by collisions between the several ion species and a buffer gas.

The multi-layer SLIM employed in the method of FIG. 13 can be implemented as an array of parallel wiring boards in a gas-filled chamber. The method can further include introducing voltage signals for the separation mode and surfing mode TW electric field patterns into the chamber on one or more multi-conductor feedthroughs coupled to a motherboard. The voltage signals can be distributed directly from the motherboard to each of the parallel wiring boards, via e.g. receptacles mounted on the motherboards, edge connectors of the wiring boards, or direct cable connections.

Method of Manufacture

Figure 14:
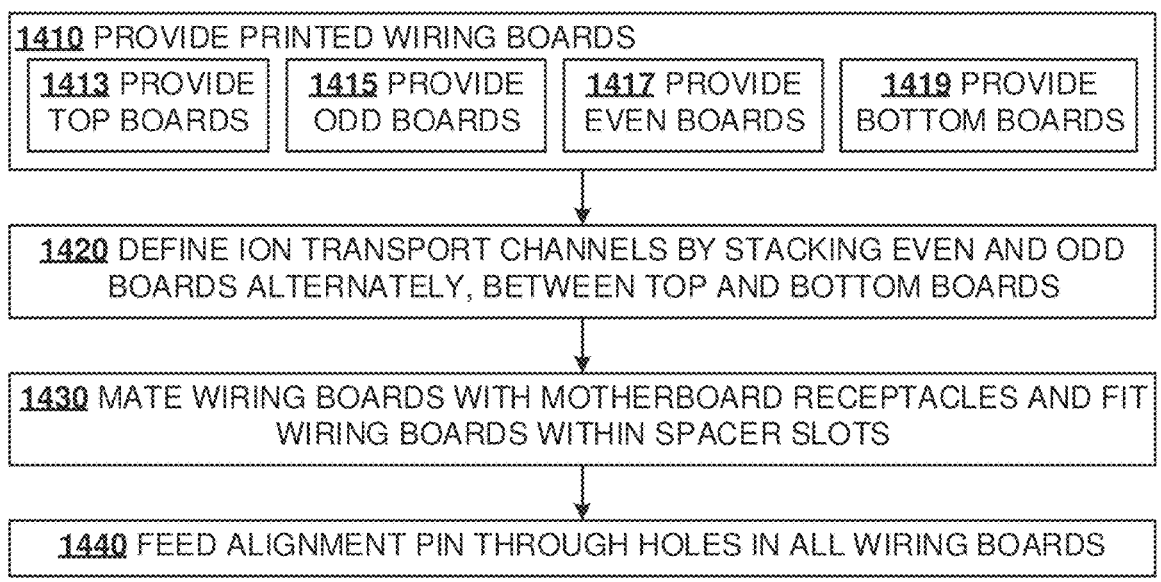
FIG. 14 is a flowchart of an example method for manufacturing a multi-level ion manipulation system according to the disclosed technologies.

FIG. 14 is a flowchart 1400 of an example method for manufacturing a multi-level ion manipulation system. Printed wiring boards can be assembled to define ion transport channels between each adjacent pair of the boards. In some examples, elevator channels, coupling ion transport channels on adjacent levels, can be defined by respective orifices in the intermediate wiring boards. In some examples, the wiring boards can be mated with respective motherboard receptacles and respective slots of slotted spacers to form an assembly with precise dimensioning.

At process block 1410 various printed wiring boards can be provided, including two top boards (for level 1, and including an ion entrance) and two bottom boards (for a last level including an ion exit) provided at sub-blocks 1413, 1419, boards for odd-numbered positions ("odd boards") at sub-block 1415, and boards for even-numbered positions ("even boards") at sub-block 1417. The odd boards can be identical or interchangeable with each other. The even boards can be identical or interchangeable with each other. In some examples, each of the even and odd boards can incorporate an orifice.

At process block 1420, ion transport channels can be defined by stacking the even and odd boards alternately, sandwiched between the top and bottom boards. As a simple illustration, 14 boards can be stacked bottom to top in the order Bottom-1, Bottom-2, 1, 2, 3, 4, 5, 6, 7, 8, 9, 10, Top-2, Top-1, where 1, 3, 5, 7, and 9 designate odd boards, and 2, 4, 6, 8, 10 designate even boards. The ion transport channels can include serpentine channels intended for ion mobility separation between opposing surfaces of the successive board pairs. In some examples, the ion transport channels can include vertical elevator channels coupling pairs of the serpentine channels. In some examples, the Top-2 and Top-1 boards may be omitted.

At process block 1430, the wiring boards can be mated with receptacles of one or more motherboards to provide electrical connectivity to the electrodes on the wiring boards. The wiring boards can also be fitted into respective parallel slots of one or more spacers, so as to maintain precise separation between the boards. At process block 1440, an alignment pin can be fed through corresponding holes in all the wiring boards, so as to maintain precise transverse registration between the boards (i.e. minimal positional variation of the wiring boards within their respective planes).

Numerous variations are possible. The number of different wiring boards can be further reduced. With suitable layout of electrodes and orifices, the odd and even boards can be made identical to each other, having electrode layouts with mirror image patterns, so that turning a board upside down (i.e. rotating the board 180° about an axis in the plane of the board) changes an odd board into an even board or vice versa. A top or bottom board can be made identical to or interchangeable with an even board or an odd board. While the electrode patterns can be the same between, say, a bottom board and even board #2, suitable wiring on the motherboard can be used to provide different excitation patterns. Thereby transport channels on board #2 can route to or from an orifice or elevator channel, while the transport channels defined by the bottom boards can bypass the corresponding orifice and route from an entry port of the multi-level SLIM.

General Considerations

As used in this application and in the claims, the singular forms "a," "an," and "the" include the plural forms unless the context clearly dictates otherwise. Additionally, the term "includes" means "comprises." Further, the terms "coupled" or "attached" encompass mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatuses are referred to as "lowest", "best", "minimum," or the like. It will be appreciated that such descriptions are intended to indicate that a selection among many used functional alternatives can be made, and such selections need not be better, smaller, or otherwise preferable to other selections.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

In view of the many possible embodiments to which the principles of the disclosed technology may be applied, it should be recognized that the illustrated embodiments are only preferred examples and should not be taken as limiting in scope. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus comprising:
   a first set of electrodes configured to direct ions in a first direction to an elevator entrance; and
   a second set of electrodes configured to generate a traveling wave propagating to the elevator entrance in a second direction opposed to the first direction.

2. The apparatus of claim 1, wherein the first set of electrodes comprises first confinement electrodes arranged on opposed surfaces and first traveling wave electrodes arranged on the opposed surfaces, and the second set of electrodes comprises second traveling wave electrodes arranged on the opposed surfaces.

3. The apparatus of claim 2, wherein the first set of electrodes define an ion transport channel on a first ion mobility separation level between the opposed surfaces, the ion transport channel terminating at the elevator entrance.

4. A multi-level ion manipulation system comprising a plurality of apparatuses according to claim 3 and arranged adjacently in sequence, and comprising one or more elevators, such that the ion transport channels of each adjacent pair of the apparatuses are coupled by a respective one of the elevators.

5. The multi-level ion manipulation system of claim 4, wherein at least one of the ion transport channels is serpentine, with a length exceeding three times a maximum length dimension of the corresponding ion mobility separation level.

6. The multi-level ion manipulation system of claim 4, wherein at least one of the elevators comprises an ion elevator channel through an aperture in one of the opposed surfaces, the ion elevator channel coupling the elevator entrance on the first ion mobility separation level to an elevator exit on a second ion mobility separation level.

7. The multi-level ion manipulation system of claim 6, wherein the traveling wave is a second traveling wave, the elevator further comprises third confinement electrodes and third traveling wave electrodes defining the ion elevator channel, and the third traveling wave electrodes are configured to generate a third traveling wave propagating in a direction orthogonal to the first ion mobility separation level.

8. The multi-level ion manipulation system of claim 7, wherein the ion transport channel on the first ion mobility separation level is configured to guide and separate the ions with a first traveling wave in a separation mode; and
   the third traveling wave generated by the third traveling wave electrodes is in a surfing mode.

9. The multi-level ion manipulation system of claim 8, wherein the third traveling wave electrodes comprise transition electrodes extending at least a quarter period of the third traveling wave away from the aperture into the first ion mobility separation level.

10. The apparatus of claim 1, wherein one or more electrodes of the first set of electrodes at the elevator entrance are configured to operate in a surfing mode.

11. A method comprising:
    with a first set of electrodes, directing ions in a first direction to an elevator entrance; and
    with a second set of electrodes, generating a traveling wave propagating to the elevator entrance in a second direction opposed to the first direction.

12. The method of claim 11, wherein the first set of electrodes comprises first confinement electrodes arranged on opposed surfaces and first traveling wave electrodes arranged on the opposed surfaces, and the second set of electrodes comprises second traveling wave electrodes arranged on the opposed surfaces.

13. The method of claim 12, wherein the first set of electrodes define an ion transport channel on a first ion mobility separation level between the opposed surfaces, the ion transport channel terminating at the elevator entrance.

14. A method comprising:
    arranging a plurality of ion mobility separation levels adjacently in sequence, with adjacent pairs of levels coupled by respective elevators;
    wherein each ion mobility separation level is formed by:
      arranging a first set of traveling wave electrodes on opposed surfaces to define a respective ion transport channel of the each ion mobility separation level, the ion transport channel terminating at a respective elevator entrance; and
      arranging a second set of traveling wave electrodes on the opposed surfaces;
    wherein the elevator entrance couples the ion transport channel to the respective elevator leading to an adjacent ion mobility separation level;
    wherein the first set of traveling wave electrodes is configured to direct ions in a first direction to the elevator entrance; and
    wherein the second set of traveling wave electrodes is configured to generate a traveling wave propagating to the elevator entrance in a second direction opposed to the first direction.

15. The method of claim 14, wherein at least one of the ion transport channels is serpentine, with a length exceeding three times a maximum length dimension of the corresponding ion mobility separation level.

16. The method of claim 14, wherein at least one of the elevators comprises an ion elevator channel through an aperture in one of the opposed surfaces, the ion elevator channel coupling the elevator entrance on a first ion mobility separation level to an elevator exit on a second ion mobility separation level.

17. The method of claim 16, wherein the traveling wave is a second traveling wave, the elevator further comprises third confinement electrodes and a third set of traveling wave electrodes defining the ion elevator channel, and the method further comprises:
    with the third set of traveling wave electrodes, generating a third traveling wave propagating in a direction orthogonal to the first ion mobility separation level.

18. The method of claim 17, further comprising:
    with the ion transport channel on the first ion mobility separation level, guiding and separating the ions with a first traveling wave in a separation mode; and
    with the third traveling wave electrodes, generating the third traveling wave in a surfing mode.

19. The method of claim 18, wherein the third traveling wave electrodes comprise transition electrodes extending at least a quarter period of the third traveling wave away from the aperture into the first ion mobility separation level.

20. The method of claim 11, further comprising operating one or more electrodes of the first set of electrodes at the elevator entrance in a surfing mode.

21. The multi-level ion manipulation system of claim 4, wherein for each of the apparatuses, the opposed surfaces are surfaces of respective printed wiring boards (PWBs).

22. The multi-level ion manipulation system of claim 21, further comprising:
   a frame including at least one motherboard; and
   a plurality of connectors mounted on the motherboard and configured to provide electrical signals to the first and second sets of electrodes of the apparatuses;
   wherein the PWBs are retained in the frame in a spaced apart configuration.

23. The multi-level ion manipulation system of claim 22, further comprising an alignment mechanism configured to align the PWBs in relation to the frame.

24. The multi-level ion manipulation system of claim 21, wherein the PWBs of the apparatuses collectively comprise an alternating sequence of even-numbers PWBs and odd-numbered PWBs, wherein the odd-numbered PWBs are interchangeable and the even-numbered PWBs are interchangeable.

25. The multi-level ion manipulation system of claim 21, wherein the PWBs of the apparatuses collectively comprise an alternating sequence of even-numbers PWBs and odd-numbered PWBs, wherein the odd-numbered PWBs have identical first electrode layouts, and the even-numbered PWBs have identical second electrode layouts.

* * * * *